US012756706B2

(12) United States Patent
Harris et al.

(10) Patent No.: US 12,756,706 B2
(45) Date of Patent: Oct. 6, 2026

(54) SUPERVISED REMOTE IDENTITY PROOFING SYSTEM

(71) Applicant: NEXTGENID, INC., Fairfax, VA (US)

(72) Inventors: Michael Harris, Summerville, SC (US); Mohab Murrar, Haymarket, VA (US); Timothy Ghanem, Oakton, VA (US)

(73) Assignee: NEXTGENID, INC., Fairfax, VA (US)

( * ) Notice: Subject to any disclaimer, the term of this patent is extended or adjusted under 35 U.S.C. 154(b) by 268 days.

(21) Appl. No.: 18/460,090

(22) Filed: Sep. 1, 2023

(65) Prior Publication Data

US 2024/0406170 A1 Dec. 5, 2024

Related U.S. Application Data

(60) Provisional application No. 63/506,057, filed on Jun. 2, 2023.

(51) Int. Cl.
*H04L 9/40* (2022.01)

(52) U.S. Cl.
CPC ........ *H04L 63/0876* (2013.01); *H04L 63/126* (2013.01)

(58) Field of Classification Search
CPC .......................... H04L 63/0876; H04L 63/126
See application file for complete search history.

(56) References Cited

U.S. PATENT DOCUMENTS 7,828,652 B2 11/2010 Nguyen et al.
8,782,758 B2 7/2014 Kamakura
(Continued)

FOREIGN PATENT DOCUMENTS

CN 109784012 A 5/2019

OTHER PUBLICATIONS

NextgenID—https://www.nextgenid.com/, accessed Jun. 5, 2023, 17 pages.

(Continued)

*Primary Examiner* — Khoi V Le
(74) *Attorney, Agent, or Firm* — Vorys, Sater, Seymour and Pease LLP; Khaled Shami

(57) ABSTRACT

The present disclosure relates the establishment and management of supervised remote identity proofing, validation, or verification (SRIP) sessions. For example, one or more embodiments include a system, comprising: memory to store computer executable instructions; and one or more processors that execute the computer executable instructions to implement a SRIP manager configured to orchestrate SRIP session assignments amongst a plurality of SRIP trusted agent stations, and monitor connection integrity during an SRIP session between an SRIP trusted agent station and an SRIP identity station. The SRIP identity station can be configured to capture multimedia data to facilitate an identity proofing, verification, and/or validation operation. Also, the SRIP trusted agent station can be configured to receive the multimedia data to proctor the identity proofing operation. The computer executable instructions can further be executed by the one or more processors to implement a worker module configured to relay the multimedia data between the SRIP identity station and the SRIP trusted agent station via one or more multimedia communication channels.

18 Claims, 7 Drawing Sheets

(56) References Cited

U.S. PATENT DOCUMENTS

| | | | | |
|---|---|---|---|---|
| 9,256,719 | B2 | 2/2016 | Berini et al. | |
| 9,256,720 | B2 | 2/2016 | Berini et al. | |
| 9,864,992 | B1 | 1/2018 | Robinson et al. | |
| 10,467,468 | B2 * | 11/2019 | Livesay | H04W 12/02 |
| 10,963,549 | B2 * | 3/2021 | Berini | H04L 9/3231 |
| 10,963,669 | B2 | 3/2021 | Berini et al. | |
| 11,405,380 | B2 * | 8/2022 | Dorfman | G06Q 20/3276 |
| 11,455,862 | B2 | 9/2022 | Williams et al. | |
| 11,482,067 | B2 | 10/2022 | Forutanpour et al. | |
| 11,601,816 | B2 | 3/2023 | Lim et al. | |
| 11,611,553 | B2 | 3/2023 | Caluwaert | |
| 2012/0003010 | A1 | 1/2012 | Birumachi | |
| 2016/0027551 | A1 | 1/2016 | Mizushima et al. | |
| 2016/0037171 | A1 | 2/2016 | Heng et al. | |
| 2017/0032327 | A1 | 2/2017 | Fisher | |
| 2017/0286768 | A1 * | 10/2017 | Livesay | H04W 12/02 |
| 2019/0031994 | A1 | 1/2019 | Tanaka et al. | |
| 2020/0244633 | A1 * | 7/2020 | Sprague | H04L 63/126 |
| 2022/0005089 | A1 | 1/2022 | Shaked | |
| 2022/0005130 | A1 | 1/2022 | Wong et al. | |

OTHER PUBLICATIONS

NextgenID—https://www.nextgenid.com/markets-srip.php, accessed Jun. 5, 2023, 10 pages.

Simply Connect—https://www.simplyconnect.com.sg/index.php/en/solutions/by-application/remote-kiosk-management-solution, accessed Jun. 5, 2023, 4 pages.

Mascellino, "Aratek introduces new biometric kiosk for border control at Bangkok conference," BiometricUpdate.com, https://www.biometricupdate.com/202211/aratek-introduces-new-biometric-kiosk-for-border-control-at-bangkok-conference, Nov. 29, 2022, 3 pages.

Hikvision—Enrollment Station—https://www.hikvision.com/en/products/Accessories/Access-Control-Accessories/Enrollers/ds-k1f600u-d6e/, accessed Jun. 5, 2023, 2 pages.

* cited by examiner

SUPERVISED REMOTE IDENTITY PROOFING SYSTEM

CROSS-REFERENCE TO RELATED APPLICATIONS

This application claims priority to and the benefit of U.S. Provisional Application Ser. No. 63/506,057 filed Jun. 2, 2023 and titled "Supervised Remote Identity Proofing System," which is incorporated by reference herein in its entirety.

FIELD OF THE DISCLOSURE

The present disclosure relates generally to systems and/or methods for identity verification, validation, and/or proofing and, more particularly, to supervised remote identity proofing (SRIP) operations between an operator (e.g., a trusted agent) and an enrollee employing, for example, one or more computerized identity stations.

BACKGROUND OF THE DISCLOSURE

In recent years, the growing trend of digitalization and online transactions has necessitated robust and reliable identity systems to establish, verify, validate, and proof an individual's identity to prevent fraud, theft, and unauthorized access. As the interactions in the digital space increase, it becomes more challenging to establish the real-world identity of an individual via a remote connection (e.g., via an Internet or mobile connection). Traditional methods for identity verification and proofing often include physical in-person presentation of identification documents (e.g., government identification records and/or records issued by a recognized authority) and/or knowledge-based authentication. Traditionally, these transactions are carried out in the physical presence of a trained and trusted agent (e.g., a government agent and/or authorized identity expert).

Attempts to automate identity verification and proofing have typically utilized unsupervised systems that compare an individual's submitted identification documents (e.g., a driver's license, passport, and/or the like) with a self-portrait. Additionally, biometric identification measures (e.g., including facial recognition, fingerprint identification, and/or iris scanning) have been incorporated into some identity proofing systems in an attempt to enhance system security.

SUMMARY OF THE DISCLOSURE

Various details of the present disclosure are hereinafter summarized to provide a basic understanding. This summary is not an extensive overview of the disclosure and is neither intended to identify certain elements of the disclosure nor to delineate the scope thereof. Rather, the primary purpose of this summary is to present some concepts of the disclosure in a simplified form prior to the more detailed description that is presented hereinafter.

According to an embodiment consistent with the present disclosure, a system is provided. A system, comprising: memory to store computer-executable instructions; and one or more processors, operatively coupled to the memory, that execute the computer executable instructions to implement a supervised remote identity proofing (SRIP) manager configured to orchestrate SRIP session assignments amongst a plurality of SRIP identity stations, and monitor connection and session integrity during an SRIP session between an SRIP trusted agent station and an SRIP identity station. The SRIP identity station can be configured to capture multimedia data to facilitate at least one of an identity-proofing operation, an identity verification operation, and an identity validation operation. Also, the SRIP manager can be configured to enable the SRIP trusted agent station to present the multimedia data to proctor the at least one of the identity-proofing operation, the identity verification operation, and the identity validation operation. The computer executable instructions can further be executed by the one or more processors to implement a worker module configured to relay the multimedia data between the SRIP identity station and the SRIP trusted agent station via one or more multimedia communication channels.

According to an embodiment, a computer-implemented method is provided. The computer-implemented method can comprise assigning, by one or more first processors, supervised remote identity proofing (SRIP) sessions amongst a plurality of SRIP trusted agent stations. The computer-implemented method can also comprise monitoring, by the one or more first processors, connection integrity during an SRIP managed session between an SRIP identity station and an SRIP trusted agent station. The SRIP identity station can be configured to capture multimedia data to facilitate an identity proofing operation. Also, the SRIP trusted agent station can be configured to present the multimedia data to a trusted agent to proctor the identity proofing operation. The computer-implemented method can further comprise relaying, by one or more second processors, the multimedia data between the SRIP identity station and the SRIP trusted agent station via one or more multimedia communication channels.

According to an embodiment, a computer program product for establishing a supervised remote identity proofing (SRIP) session is provided. The computer program product can comprise a computer readable storage medium having computer executable instructions embodied therewith. The computer executable instructions executable by one or more processors to cause the one or more processors to assign SRIP sessions, amongst a plurality of SRIP trusted agent stations. Also, the computer executable instructions can cause the one or more processors to monitor connection integrity during the SRIP session between an SRIP trusted agent station and an SRIP identity station. The SRIP identity station can be configured to capture multimedia data to facilitate an identity proofing operation. Additionally, the SRIP manager can be configured to distribute the multimedia data with the SRIP trusted agent station to proctor the identity proofing operation. Further, the computer executable instructions can cause the one or more processors to relay the multimedia data between the SRIP identity station and the SRIP trusted agent station via one or more multimedia communication channels.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
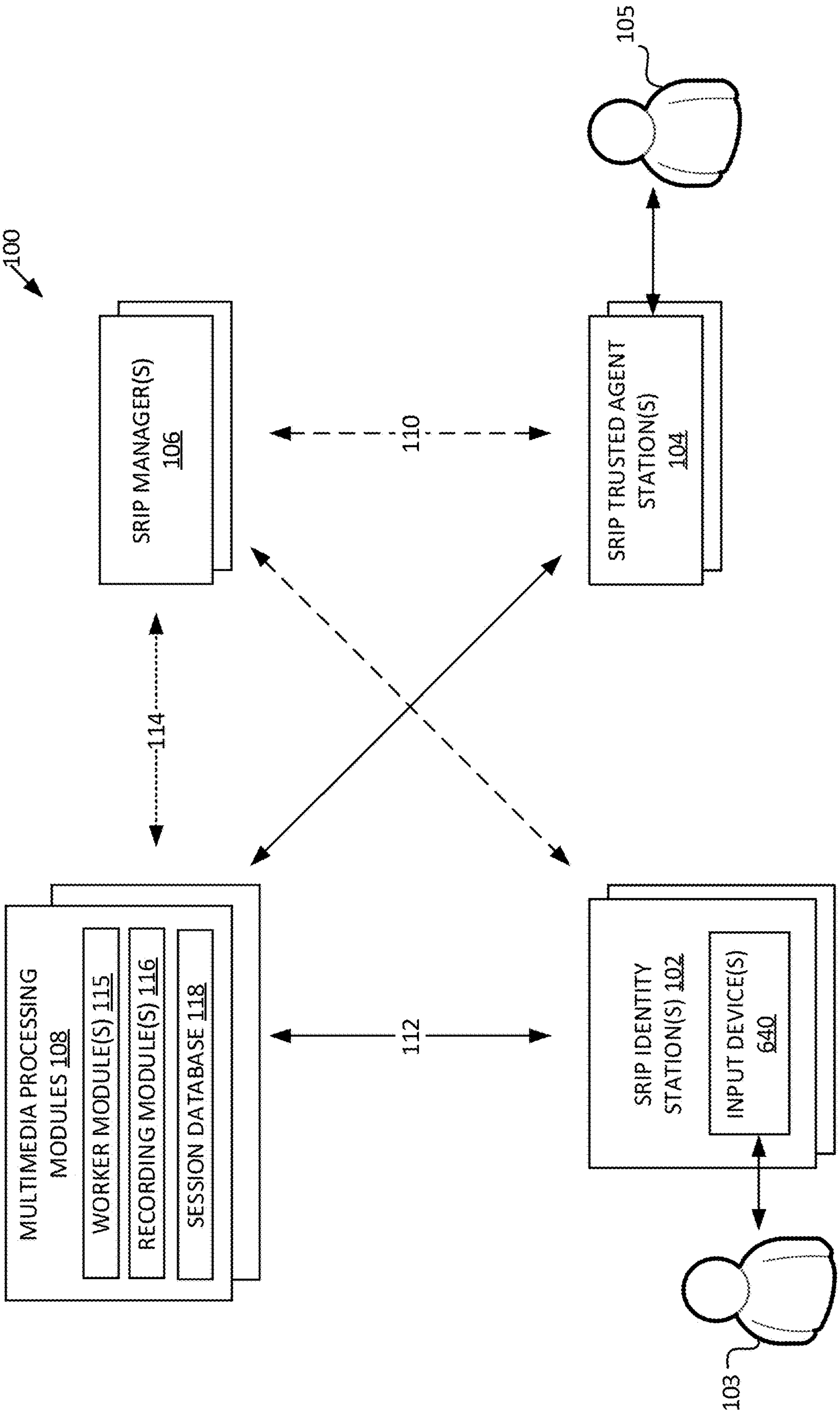
FIG. 1 is a diagram of a non-limiting example system that can facilitate one or more SRIP sessions managed by one or more SRIP controllers and/or serviced by one or more multimedia processing modules in accordance with one or more embodiments described herein.

Embodiments of the present disclosure will now be described in detail with reference to the accompanying figures. Elements of the same type/purpose in the various figures may be denoted by matched reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

While traditional remote identity proofing systems provide a basic level of assurance, such systems are susceptible to various forms of fraud (e.g., including stolen identities, forged identification documents, augmented digital content, and/or the like). For instance, a bad faith actor may attempt to deceive a traditional identity proofing system using a pre-recorded video in place of a live-stream video. In another instance, a bad faith actor may attempt to deceive an identity proofing system using generative artificial intelligence to develop deep-fake video streams and/or counterfeit credentials. Additionally, the incorporation of biometric data for identity verification can result in data privacy concerns, the potential for user error, and/or the required use of specialized equipment. Further, traditional identity proofing systems typically operate on the basis of trust-on-first-use and thereby fail to provide continuous verification, or re-verification, of session participants.

Embodiments in accordance with the present disclosure generally relate to systems and/or computer-implemented methods to facilitate identity proofing operations for meeting Identity Assurance Level IAL-3 in accordance with standards set by the National Institute of Standards and Technology ("NIST"). Various embodiments described herein include an SRIP client (e.g., an identity station, such as a kiosk) that can engage in a session with an SRIP trusted agent station (e.g., employed by a trusted agent, such as an authorized identity verification operator), where the individual sessions can be managed by one or more SRIP managers. For example, the one or more SRIP managers can route one or more SRIP sessions between a matched SRIP trusted agent station and SRIP client. Further, the SRIP sessions can be facilitated by a multimedia processing module. The SRIP identity station (e.g., a kiosk) can be operated by an applicant whose identity is to be verified, and the SRIP trusted agent station can be operated by a trusted agent. The session can enable the trusted agent to, via the SRIP trusted agent station, remotely authenticate an applicant's identity, validate applicant input data, assist the applicant in a customer service manner, and/or ensure the integrity of applicant communications and/or assertions.

Moreover, various embodiments described herein can constitute one or more technical improvements over conventional in-person identity proofing and/or identity proofing systems by continuously monitoring the integrity of an SRIP session. For instance, various embodiments described herein can utilize digital signatures from both an SRIP identity station and SRIP trusted agent station to initially validate a session, and can further monitor the connectivity of both devices; where the session can be automatically terminated by the SRIP trusted agent station or manually terminated by the trusted agent based on a party's disconnection and/or a detected security concern. Additionally, one or more embodiments described herein can have a practical application by orchestrating multiple sessions per SRIP trusted agent station such that a single trusted agent can perform multiple identity proofing operations simultaneously with regards to multiple applicants on multiple SRIP identity stations. Further, one or more embodiments can include applying said orchestration to a pool of SRIP trusted agent stations such that session initiation requests are routed to respective SRIP trusted agent stations based on characteristics of the requests and/or attributes of the trusted agent associated therewith.

Advantageously, one or more embodiments described herein can control a session control channel and a multimedia channel as separate communication channels to facilitate identity proofing operations during a given session between the SRIP identity station and SRIP trusted agent station. For example, the session control channel can act as a primary notification channel for session control events (e.g., session initiation, connectivity reliability checks, and/or session termination); while the multimedia channel can service multimedia streaming and can be scaled based on workload and/or bandwidth requirements. For instance, in various embodiments the SRIP manager can allocate worker modules (e.g., from a pool of multimedia processing modules) to service the multimedia channel between the SRIP identity station and SRIP trusted agent station based on network consumption. For instance, the one or more worker modules can serve as a relay for one or more multimedia channels between the SRIP identity station and SRIP trusted agent station. Additionally, in one or more embodiments the one or more worker modules can record copies of the multimedia data packets for subsequent processing by one or more record modules (e.g., from the pool of multimedia processing modules).

FIG. 1 illustrates a non-limiting example system 100 that can facilitate an SRIP session between one or more SRIP identity stations 102 and SRIP trusted agent stations 104 in accordance with one or more embodiments described herein. The one or more SRIP identity stations 102 can include one or more computer devices employed by one or more applicants 103 of the system 100 to verify the applicant's identity. The one or more SRIP trusted agent stations 104 can include one or more remote interfaces employed by one or more trusted agents 105 to assist the user in one or more identity verification processes and/or perform one or more identity proofing operations.

In various embodiments, the one or more applicants 103 can refer to an individual that utilizes one or more SRIP identity stations 102 to engage in an identity proofing session. Similarly, the one or more trusted agents 105 can refer to an individual that utilizes one or more SRIP trusted agent stations 104 to verify, validate, and/or proof the identity of an applicant 103 during an identity proofing session.

Identity verification is the process of confirming that the identity information provided by an applicant 103 matches the information held in a trusted database or source. Identity verification can involve comparing the applicant information provided (e.g., applicant name, date of birth, address, and/or the like) against reliable and/or authoritative sources to establish the authenticity and/or accuracy of the applicant's 103 alleged identity. Identity verification can be employed to ensure that the alleged identity of the applicant 103 is the actual identity of the applicant 103.

Identity validation can involve not only confirming the accuracy of the applicant's 103 identity information, but also assessing the completeness and/or consistency of the data. Thereby, identity validation processes can include evaluating the quality and/or reliability of the identity attributes provided. For example, identity validation can include checks for data consistency, such as verifying that the provided applicant address is associated with the provided applicant name and/or that the provided applicant date of birth falls within a designated range. Identity validation can help identify discrepancies or errors in the applicant's 103 identity data and can ensure that the applicant information is reliable and/or trustworthy.

Identity proofing is a comprehensive process that can involve establishing and verifying the identity of an applicant 103 beyond merely confirming the applicant's identity information. Identity proofing can establish a high level of confidence in the alleged identity of the applicant 103 by combining various identity verification and validation techniques with additional security measures. For instance, identity proofing can include, but is not limited to: document checks, biometric authentication, knowledge-based authentication, in-person verification, a combination thereof, and/or the like. In some instances, identity proofing can further include requesting additional evidence and/or conducting interviews to gather further information and assess the credibility of the alleged identity. Identity proofing can mitigate the risk of fraudulent identities and protect against identity theft, and can be employed in situations where a high level of trust and assurance is required (e.g., such as government services, financial institutions, critical infrastructure access, and/or the like). Thereby, identity proofing can encompass measures beyond the scope of traditional identity verification and/or validation processes by employing additional measures to establish a high level of confidence in the alleged identity of the applicant 103. As described further herein, one or more trusted agents 105 can utilize the SRIP trusted agent stations 104 to participate in an identity proofing session to validate, verify, and/or proof the identity of an applicant 103 that is utilizing an SRIP identity station 102.

In accordance with various embodiments described herein; during the SRIP session facilitated by the system 100, the identity of an applicant 103 employing the SRIP identity station 102 can be verified remotely under the oversight and/or supervision of a trusted agent 105 (e.g., a trusted authority) employing the SRIP trusted agent station 104; thereby the SRIP session can enhance the reliability and/or security of identity verification in remote (e.g., online) settings. For example, the applicant 103 can utilize the SRIP identity station 102 to initiate the identity verification process by providing applicant input data and/or indicating an intent to undergo identity proofing. Once the SRIP session is initiated, the applicant 103 can utilize the SRIP identity station 102 to enter identification data into the system 100. The identification data can include applicant input data (e.g., knowledge based data, unique identifiers, passwords, biometric data, a combination thereof, and/or the like) and/or identification documents (e.g., identification documents issued by a recognized authority and/or government, such as a driver's license, passport, employee badge, a combination thereof, and/or the like).

The identification data can be accessible to the trusted agent 105 via the SRIP trusted agent station 104, whereupon the identification data can be validated and/or verified (e.g., the content of the identification data can be compared to a reference database). Additionally, the applicant 103 can participate in a live (e.g., real-time or near real-time) interaction with the trusted agent 105 via one or more communication channels relayed between the SRIP identity station 102 and SRIP trusted agent station 104. As such, the trusted agent 105 can determine whether the applicant 103, as presented during the live interaction, correlates to the validated identification data. For instance, where the identification data includes an image associated with the alleged identity, the trusted agent 105 can analyze a video stream of the applicant 103 captured during the live interaction to compare an appearance of the applicant 103 with the image and assess the identity of the applicant 103. In another instance, the identification data may include applicant 103 input data utilized by the trusted agent 105 to retrieve an image associated with the alleged identity from a reference database, whereupon the trusted agent 105 can compare the presentation of the user during the live interaction with the retrieved reference image to ascertain identity verification.

Moreover, the live communication between the SRIP identity station 102 and SRIP trusted agent station 104 during the SRIP session can enable the trusted agent 105 to check the authenticity of the applicant's 103 operation of the SRIP identity station 102. For example, during the SRIP session the trusted agent 105 can utilize the SRIP trusted agent station 104 to query the applicant 103 via text, video, and/or audio-based prompts, presented to the applicant 103 via the SRIP identity station 102. For instance, the prompts can include questions for the applicant 103 to answer and/or instructions for the user to execute. In another example, during the SRIP session the trusted agent 103 can utilize the SRIP trusted agent station 104 to control one or more components of the SRIP identity station 102 to gather additional identification data. For instance, the trusted agent 103 can control one or more cameras, microphones, and/or lights of the SRIP identity station 102 in order to gather data characterizing the environment surrounding the given SRIP identity station 102 and thereby the user in proximity to the SRIP identity station 102.

One or more SRIP sessions facilitated by the system 100 can be managed by one or more SRIP managers (i.e., manager service) 106. In accordance with various embodiments described herein, the one or more SRIP managers 106 can match SRIP session requests generated by one or more SRIP identity stations 102 to one or more available SRIP trusted agent stations 104. For example, an SRIP manager 106 can match a given SRIP session request with an SRIP trusted agent station 104 from a pool of SRIP trusted agent stations 104 based on one or more characteristics delineated in the request and attributes of the SRIP trusted agent stations 104 (e.g., availability and/or capacity of the SRIP operators 104) and/or trusted agents associated therewith. In various embodiments, each SRIP trusted agent station 104 can be assigned multiple active SRIP sessions to proctor during the same time period. Additionally, the one or more SRIP managers 106 can allocate a multimedia processing module 108 to service multimedia streaming between an SRIP identity station 102 and an SRIP trusted agent station 104 during the SRIP session. For example, the allocation of the multimedia processing module 108 can be performed based on network bandwidth and/or network consumption to facilitate scaling of multimedia processing operations (e.g., such as the transferring and/or recording of multimedia streams between the SRIP identity station 102 and SRIP trusted agent station 104 of an SRIP session).

In various embodiments, the system 100 can include various types of communications channels between the one or more SRIP identity stations 102, SRIP trusted agent stations 104, SRIP managers 106, and/or multimedia processing modules 108. For example, system 100's communication channels can include one or more session control channels 110 (e.g., represented by dashed arrows in FIG. 1), multimedia channels 112 (e.g., represented by solid arrows in FIG. 1), and/or module control channels 114 (e.g., represented by dotted arrows in FIG. 1). As shown in FIG. 1, the SRIP manager 106 can relay one or more session control channels 110 between an SRIP identity station 102 and an SRIP trusted agent station 104 during an SRIP session. Also shown in FIG. 1, the multimedia processing module 108 can relay one or more multimedia channels 112 between the SRIP identity station 102 and the SRIP trusted agent station 104 during the SRIP session. Further, the SRIP manager 106 can control operations of the one or more multimedia processing modules 108 via the one or more module control channels 114.

In one or more embodiments, the communications channels (e.g., session control channels 110, multimedia channels 112, and/or module control channels 114) can be executed via one or more networks. For example, the one or more networks can comprise one or more wired and/or wireless networks, including, but not limited to: a cellular network, a wide area network ("WAN"), a local area network ("LAN"), a combination thereof, and/or the like. One or more wireless technologies that can be comprised within the one or more networks can include, but are not limited to: wireless fidelity ("Wi-Fi"), a WiMAX network, a wireless LAN ("WLAN") network, BLUETOOTH® technology, a combination thereof, and/or the like. For instance, the one or more networks can include the Internet and/or the IoT. In various embodiments, the one or more networks can comprise one or more transmission lines (e.g., copper, optical, or wireless transmission lines), routers, gateway computers, and/or servers. Further, the one or more SRIP identity stations 102, SRIP trusted agent stations 104, SRIP managers 106, and/or multimedia processing modules 108 can comprise one or more network adapters and/or interfaces (not shown) to facilitate communications via the one or more networks.

For example, the one or more SRIP identity stations 102 and SRIP trusted agent stations 104 can be remote from each other. For instance, the one or more SRIP identity stations 102 can be positioned at a first location, while the one or more SRIP trusted agent stations 104 can be positioned at a second location (e.g., distanced from the first location). Likewise, the one or more SRIP managers 106 and/or multimedia processing modules 108 can be remote from the one or more SRIP identity stations 102 and/or SRIP trusted agent stations 104, where the one or more session control channels 110 and/or multimedia channels 112 are at least partially established via a wireless network. In some embodiments, one or more of the SRIP managers 106 can be comprised in the same server, or server farm, as one or more of the multimedia processing modules 108. In various embodiments, the one or more SRIP managers 106 and/or multimedia processing modules 108 can be comprised within a distributed computing architecture (e.g., comprising multiple servers and/or service containers). For instance, the one or more SRIP managers 106 and multimedia processing modules 108 can be hosted on separate networks (e.g., can operate on separate servers and/or as separate service containers) from each other to facilitate one or more scaling operations described herein.

Figure 2:
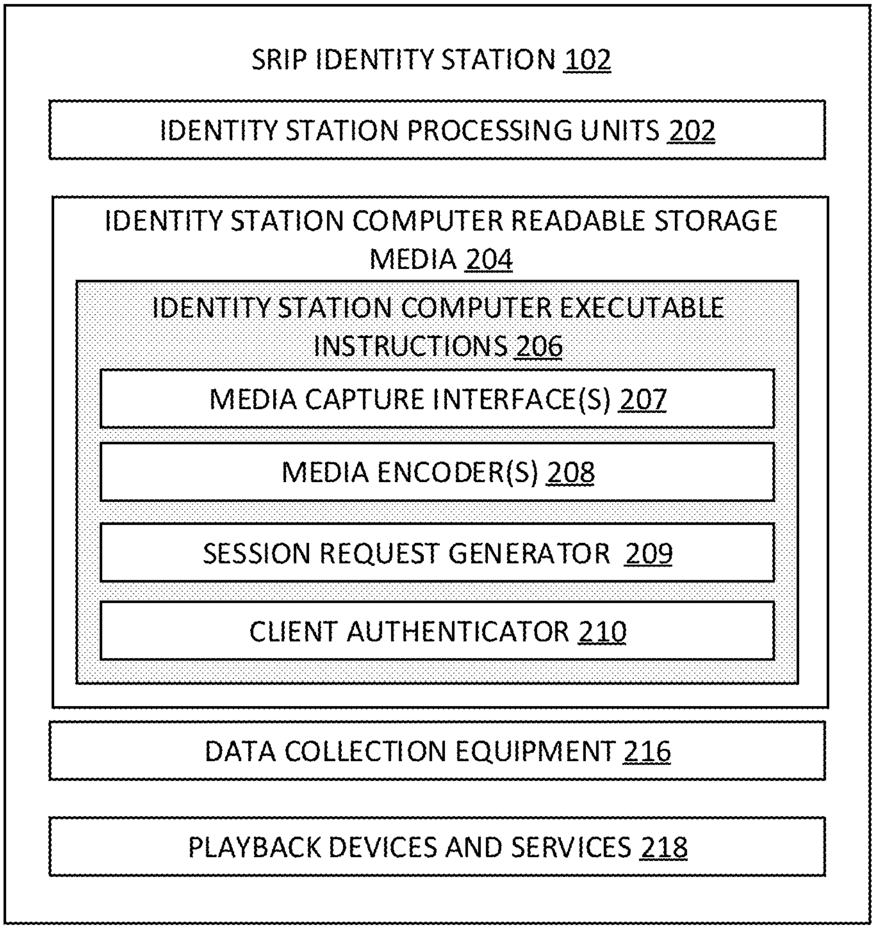
FIG. 2 is a diagram of a non-limiting example SRIP client that can be employed by one or more users of the system to undergo remote identity proofing in accordance with one or more embodiments described herein.

As shown in FIG. 2, the one or more SRIP identity stations 102 can comprise one or more identity station processing units 202 and/or identity station computer readable storage media 204. In various embodiments, the identity station computer readable storage media 204 can store one or more identity station computer executable instructions 206 that can be executed by the one or more identity station processing units 202 to perform one or more defined functions. In various embodiments, one or more media capture interfaces 207, media encoders 208, session request generators 209, and/or identity station authenticators 210 can be identity station computer executable instructions 206 and/or can be hardware components operably coupled to the one or more identity station processing units 202. For instance, in some embodiments, the one or more identity station processing units 202 can execute the media capture interfaces 207, media encoders 208, session request generators 209, and/or identity station authenticators 210 to perform various functions described herein. Additionally, the SRIP identity station 102 can comprise a data collection equipment 216 along with playback devices and services 218.

In various embodiments, the one or more SRIP identity stations 102 can be configured to collect and/or capture multimedia data (e.g., comprising digital media information such as text, images, audio, video, animation, three-dimensional models, a combination thereof, and/or the like) via the data collection equipment 216. For example, the data collection equipment 216 can include data collection systems used to enter user input data and/or identification data into system 100. For instance, the data collection equipment 216 can include, but is not limited to: cameras (e.g., digital still and/or motion cameras), lights, microphones, fingerprint scanners, facial recognition scanners, iris scanners, voice recognition systems, hand geometry scanners, vein recognition scanners, retina scanners, behavior biometric systems, keyboards, touchscreens, webcams, graphics stylus, barcode scanner, a combination thereof, and/or the like.

The one or more SRIP identity stations 102 can utilize one or more media capture interfaces 207 to control and/or receive data from the data collection equipment 216. For instance, the one or more media capture interfaces 207 can include software applications employed to: start a data capture process, stop a data capture process, adjust data capture settings, process captured data, a combination thereof, and/or the like. Example media capture interfaces 207 can include, but are not limited to: webcam interfaces, microphone interfaces, screen capture interfaces, device-specific interfaces, and/or the like. In one or more embodiments, the one or more media capture interfaces 207 can include: a graphic device interface ("GDI") (e.g., for screen capture), Microsoft Media Foundation (e.g., for both audio and video capture), Microsoft DirectShow (e.g., for camera capture), and/or the like.

In various embodiments, the multimedia data captured by the SRIP identity station 102 can include, for example: applicant 103 input data; identification data, data characterizing identity documents; real-time text, imaging, video, and/or audio streaming; a combination thereof; and/or the like. For instance, SRIP identity station 102 can capture applicant 103 input data for initiating an SRIP session. In another instance, the SRIP identity station 102 can capture identification data from the applicant 103, such as: biometric data, knowledge-based data, passwords, unique identifiers, a combination thereof, and/or the like. In a further instance, the SRIP identity station 102 can capture data that characterizes an identity document, such as image and/or scan of a driver's license, passport, employee badge, and/or other documents issued by a recognized authority. In a still further instance, the SRIP identity station 102 can capture multimedia data to facilitate a live interaction with, and/or presentation of, the environment in proximity to the SRIP identity station 102 (e.g., including an applicant 103 employing the SRIP identity station 102).

Additionally, the one or more SRIP identity stations 102 can include one or more media encoders 208 that can convert and/or encode media data (e.g., such as multimedia data captured via the data collection equipment 216 and/or media capture interfaces 207) to a desired format. For example, the one or more media encoders 208 can perform operations such as compression, transcoding, rescaling, bitrate adjustment, format conversion, frame rate conversion, and/or the like. For instance, the one or more SRIP identity stations 102 can be configured to support a variety of video and/or audio encoders. Example codecs that can be utilized for video encoding by the one or more media encoders 208 can include but are not limited to: advanced video coding (e.g., H.264), high efficiency video coding (e.g., H.265), VP8, VP9), and/or the like. Example codecs that can be utilized for audio encoding by the one or more media encoders 208 can include, but are not limited to: MP3, advanced audio coding ("AAC"), waveform audio file format ("WAV"), pulse code modulation μ-law ("PCMU"), and/or the like.

In one or more embodiments, the SRIP identity station 102 can negotiate with the media processing module 108 and/or an SRIP trusted agent 104 to define operable media encoders 208. For example, the SRIP identity station 102 can communicate (e.g., via one or more multimedia channels 112) with the one or more media processing modules 108 during a connection's negotiation in preparation of an SRIP session to define a media encoder 208 to be employed when relaying captured multimedia data. Similarly, the SRIP identity station 102 can define one or more media encoders 208 to be utilized for multimedia playback (e.g., regarding multimedia sourced from one or more SRIP trusted agent station 104) as a result of the connections negotiation. In accordance with various embodiments described herein, the connection negotiation can also define a frame rate to be employed during the SRIP session. For example, the SRIP identity station 102 need not depend on the ability of the data collection equipment 216 to provide digital frames on the requested rate (e.g., defined via the connection negotiation); rather, the SRIP identity station 102 can implement a frame rate control mechanism to ensure that video frames are captured and/or provided at the requested frame rate.

Additionally, the one or more SRIP identity stations 102 can be configured to receive and/or standardize remote multimedia streams (e.g., generated by the one or more SRIP trusted agent station 104) for presentation via the one or more playback devices and services 218. The playback devices and services 218 can include but are not limited to: one or more screens (e.g., liquid crystal displays, light emitting diodes, organic light emitting diodes, active matrix organic light emitting diodes, electronic ink, plasma displays, quantum dot displays, and/or the like), speakers, streaming services, media player software, digital media receivers and/or players, a combination thereof, and/or the like. For example, the one or more playback devices and services 218 can include a main screen for interacting with one or more identity proofing operations and an auxiliary screen to provide one or more video tutorials for how to interact with the identity proofing operations.

For example, during an SRIP session, the SRIP identity station 102 can establish multiplex multimedia streams with a media processing module 108 via the one or more multimedia channels 112. Upon receiving encoded multimedia data (e.g., digital multimedia frames) via one or more multimedia channels 112. the SRIP identity station 102 can decode the data using the media encoder 208 defined via the connection negotiations (e.g., to construct a full video or audio frame). Thereby, the SRIP identity station 102 can utilize the playback devices and services 218 to play and/or further render the full multimedia frames.

In one or more embodiments, the data collection equipment 216 and/or the playback devices and services 218 can include hardware and/or software features designed to assist people with disabilities, as defined in the Americans with Disabilities Act, utilize the SRIP identity station 102 and/or participate in the SRIP session. For example, the data collection equipment 216 and/or the playback devices and services 218 can include an audio-assisted screen reader to support blind users. In another example, the data collection equipment 216 and/or the playback devices and services 218 can include voice-to-text computer applications to facilitate data entry.

In various embodiments, the SRIP identity station 102 can further comprise a session request generator 209. For example, the session request generator 209 can generate one or more SRIP session requests to prepare an SRIP session in accordance with one or more embodiments described herein. The SRIP session request can include one or more characteristics defined by, for example, applicant 103 input data. As described further herein, to prepare an SRIP session, the SRIP identity station 102 can establish a session control channel 110 with an SRIP manager 106, which can reserve a SRIP trusted agent station 104 to service the requested SRIP session using the one or more characteristics as filter criteria for selecting the given SRIP trusted agent station 104 in accordance with various embodiments described herein. For example, where a trusted agent 105 logs into an SRIP trusted agent station 104, the SRIP trusted agent station 104 can thereby be associated with one or more characteristics (e.g., attributes) from the trusted agent's profile account.

In one or more embodiments, the SRIP identity station 102 can also include an identity station authenticator 210. As described further herein, the identity station authenticator 210 can facilitate one or more authentication and authorization operations between the SRIP identity station 102 and the SRIP manager 106. In some embodiments, SRIP identity station 102 authentication can also be a part of SRIP session preparation, where establishment of an SRIP session by the SRIP manager 106 can be predicated on authentication of the SRIP identity station 102 and/or the SRIP operator 104.

In accordance with one or more embodiments described herein, the SRIP identity station 102 can communicate with a matched SRIP trusted agent station 104 during an SRIP session (e.g., as coordinated by the SRIP manager 106) such that an trusted agent employing the SRIP trusted agent station 104 can remotely verify, validate, and/or proof the identity of an applicant 103 employing the SRIP identity station 102. Each SRIP trusted agent station 104 can be active in multiple SRIP sessions simultaneously, where each respective SRIP session is with a respective SRIP identity station 102. For example, the maximum number of possible active SRIP sessions per SRIP trusted agent station 104 can be predefined based on available computer resources and/or based on a predefined configuration enforced by the SRIP manager 106.

As described further herein, the SRIP trusted agent station 104 can be matched with an SRIP identity station 102 during a preparation stage of the SRIP session. During the SRIP session preparation, the SRIP trusted agent station 104 can establish a session control channel 110 with the SRIP manager 106 to facilitate one or more authentication and authorize procedures. Additionally, the SRIP trusted agent 104 can establish a multimedia channel 112 with a media processing module 108 allocated to the SRIP session request, where the SRIP trusted agent station 104 can participate in the connection negotiations described herein via the multimedia channel 112.

Figure 3:
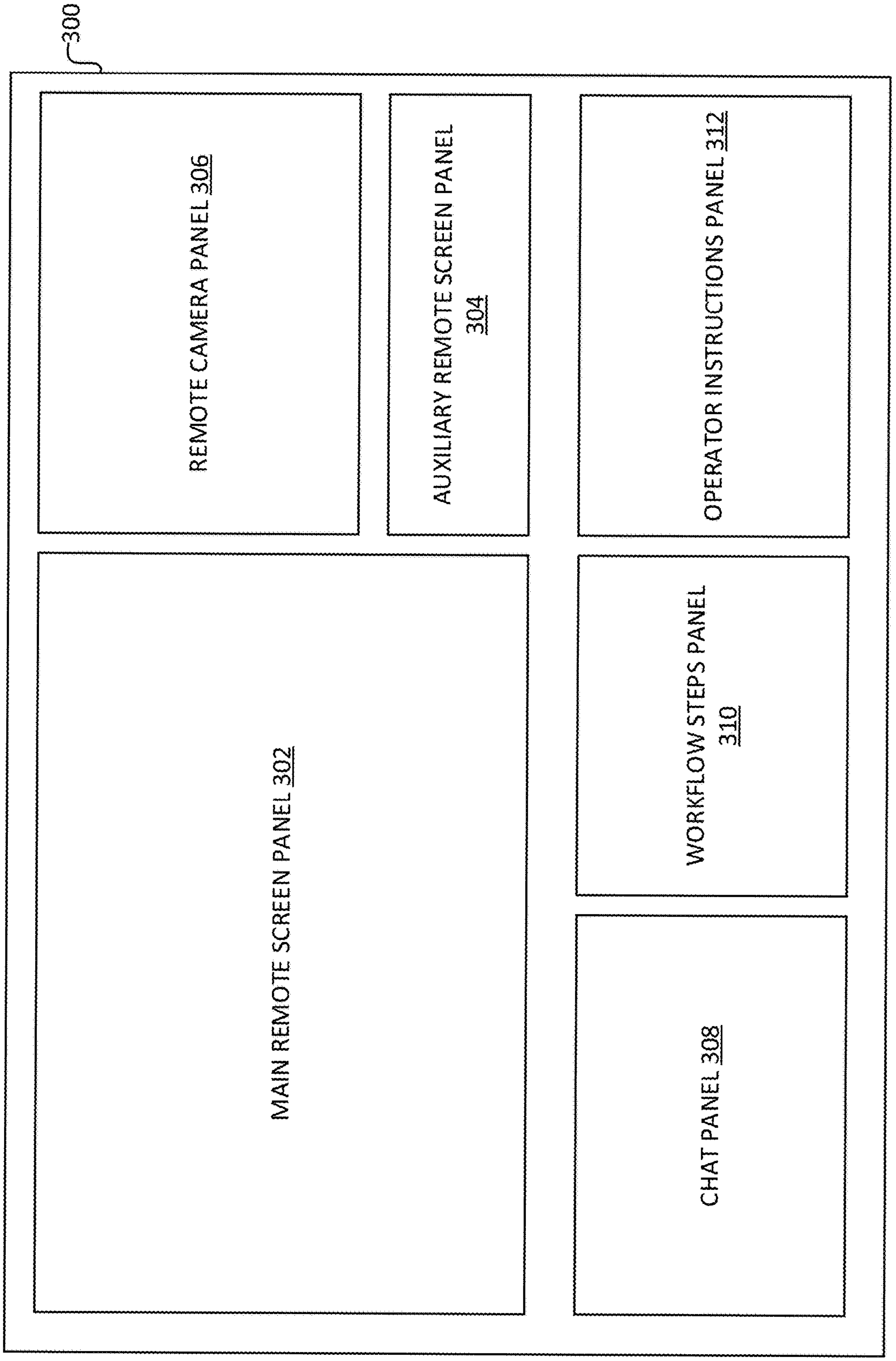
FIG. 3 is a diagram of a non-limiting example SRIP agent console of an SRIP trusted agent station, which can be utilized by one or more trusted agents to perform one or more SRIP sessions in accordance with one or more embodiments described herein.

Once an assigned SRIP session is established, the SRIP trusted agent station 104 can provide a portable web browser console that can be employed by the trusted agent to interact with the SRIP identity station 102, and thereby the applicant 103. FIG. 3 illustrates a non-limiting example agent console 300 that can be generated by the SRIP trusted agent station 104 and utilized by the identify verifier to perform the identity proofing operations in accordance with one or more embodiments described herein. While the example agent console 300 provides an example layout to illustrate various features of the SRIP trusted agent station 104, the user interface of agent console 300 is not limited to the architecture of FIG. 3. For example, agent consoles 300 embodying different types and/or locations of various functional panels are also envisaged.

As shown in FIG. 3, the SRIP trusted agent station 104 can provide an agent console 300 with multiple video streams, including, but not limited to: a main remote screen panel 302, one or more one or more auxiliary remote screen panels 304, and/or one or more remote camera panels 306. Where the SRIP trusted agent station 104 is assigned to multiple SRIP sessions, the trusted agent 105 can cycle between multiple agent consoles 300 (e.g., an agent console 300 can be provided for each SRIP session). For instance, a plurality of agent consoles 300 can be presented to the trusted agent 105 via one or more additional physical or virtual monitors. In various embodiments, the main remote screen panel 302 can present a main display that that is shown on the SRIP identity station 102 and visible to the applicant 103. In some instances, the SRIP identity station 102 can additionally show one or more auxiliary displays, which can also be presented to the trusted agent via the auxiliary remote screen panel 304. The remote camera panel 306 can present a video feed from one or more cameras of the identity station 102. The agent console 300 can further include one or more chat panels 308 for text messaging with an applicant 103 at the SRIP identity station 102 engaged in the SRIP session. Additionally, the agent console 300 can include one or more workflow step panels 310 for a breadcrumb view (e.g., characterizing an applicant's 103 progression through one or more workflows) of the current workflow step that is being viewed on one or more of the video streams. Moreover, the agent console 300 can include an operator instructions panel 312 that can guide the trusted agent about the necessary validation criteria to be executed at a given step of the workflow.

For example, the main remote screen panel 302 can display a real-time, or near real-time, screen capture of a main screen of the playback devices and services 218. For instance, an applicant 103 can interact with the main screen of the playback devices and services 218 during the SRIP session to execute one or more steps prescribed in the workflows and facilitate the identity proofing. As the applicant 103 interacts with a main screen of the SRIP identity station 102, the multimedia data presented by the main screen can be shared with the SRIP trusted station 104 (e.g., via the one or more worker modules 115 and multimedia channels 112) and presented to the trusted agent 105 via the main remote screen panel 302. Similarly, the auxiliary remote screen panel 304 can display a real-time, or near real-time, screen capture of an auxiliary screen of the playback devices and services 218. For instance, during the SRIP session an auxiliary screen of the SRIP identity station 102 can present one or more tutorials (e.g., video guides) to assist the applicant 103 in completing a current step prescribed in the workflow. Additionally, the remote camera panel 306 can display a real-time, or near real-time, stream of audio and/or video data captured by the data collection equipment 216 (e.g., by one or more cameras and/or microphones) during the SRIP session. By monitoring the main remote screen panel 302, the auxiliary remote screen panel 304, and/or the remote camera panel 306; the trusted agent 105 can employ the SRIP trusted agent station 104 to remotely proctor the applicant's 103 interaction with the SRIP identity station 102 and prescribes steps of the workflow.

Additionally, the trusted agent 105 can utilize the chat panel 308, the workflow steps panel 310, and/or the operator instructions panel 312 to assist the applicant 103 in completing one or more steps prescribed in the workflow. For example, the trusted agent 105 can utilize the chat panel 308 to answer questions posed by the applicant 103 and/or instruct the user in how to comply with one or more requests. By monitoring the workflow steps panel 310, the trusted agent 105 can ascertain how far along the workflow the applicant 103 has progressed and/or next steps in the workflow to be completed. Where a trusted agent 105 is active in multiple SRIP sessions, the workflow steps panel 310 can assist in quickly identifying the progress of each respective SRIP session. Moreover, the operator instructions panel 312 can delineate instructions to be executed in order to complete one or more steps of the workflow. For example, the operator instructions panel 312 can delineate reference information (e.g., reference images, reference identification information, and/or reference biometric data) to be retrieved to facilitate a comparison with the data captured by the data collection equipment 216. In another example, the operator instructions panel 312 can include troubleshooting information that can be employed by the trusted agent 105 to address one or more customer service concerns.

Figure 4:
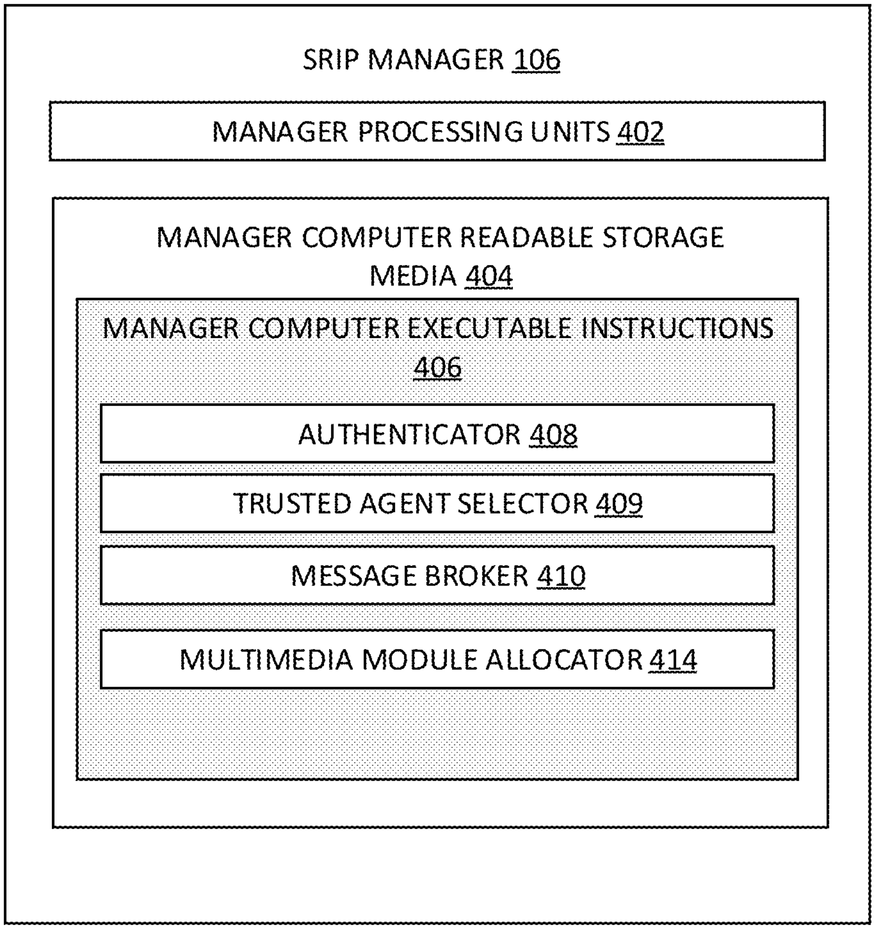
FIG. 4 is a diagram of a non-limiting example SRIP manager that can manage one or more SRIP session in accordance with one or more embodiments described herein.

As shown in FIG. 4, the one or more SRIP managers 106 can comprise one or more manager processing units 402 and/or manager computer readable storage media 404. In various embodiments, the manager computer readable storage media 404 can store one or more manager computer executable instructions 406 that can be executed by the one or more manager processing units 402 to perform one or more defined functions. In various embodiments, one or more authenticators 408, trusted agent selectors 409, message brokers 410, and/or media module allocators 414 can be manager computer executable instructions 406 and/or can be hardware components operably coupled to the one or more manager processing units 402. For instance, in some embodiments, the one or more manager processing units 402 can execute authenticators 408, trusted agent selectors 409, message brokers 410, and/or media module allocators 414 to perform various functions described herein.

In various embodiments, the one or more SRIP managers 106 can be configured to prepare an SRIP session, match SRIP session requests with available SRIP trusted agent stations 104, allocate a multimedia processing module 108 to service a given SRIP session, monitor connection integrity between the SRIP identity station 102 and SRIP trusted agent station 104 during an active SRIP session, and/or manage messages between the SRIP identity station 102 and SRIP trusted agent station 104. For example, the one or more SRIP managers 106 can include an authenticator 408, which can serve as the primary authentication and authorization framework that enables SRIP identity stations 102 and/or SRIP trusted agent stations 104 to authenticate themselves. The authentication context can then be used to authorize specific operations of the SRIP manager 106. In one or more embodiments, the authenticator 408 can delegate authentication of the SRIP identity stations 102 and/or SRIP trusted agent stations 104 to one or more external authentication providers. For example, each of the SRIP identity stations 102, SRIP trusted agent stations 104, and/or SRIP managers 106 can have digital certificates (e.g., SSL/TLS certificates) issued by a certificate authority that can be analyzed by the authenticator 408 to established secured connections The device certificates can include information such as: device name, an associated public key, and/or the digital signature of the certificate authority.

The trusted agent selector 409 can match an SRIP session request generated by an SRIP identity station 102 with an SRIP trusted agent station 104. For example, the trusted agent selector 409 can reserve an SRIP trusted agent station 104 in preparation of an SRIP session. For instance, before an SRIP identity station 102 can start an SRIP session with an SRIP trusted agent station 104, said SRIP trusted agent station 104 is first reserved by the trusted agent selector 409. In various embodiments, the trusted agent selector 409 can perform the SRIP trusted agent station 104 reservation via trait-based filtering, pool allocation, and/or agent allocation. For example, the SRIP trusted agent stations 104 can be categorized into a plurality of pools based on agent traits, where SRIP trusted agent stations 104 of the same pool can be associated with trusted agents sharing common traits. For instance, each trusted agent can be associated with an agent profile, which can be further associated with an SRIP trusted agent station 104 in response to the identity verifier logging into the given SRIP trusted agent station 104 (e.g., via multifactor authentication credentials). As such the traits associated with an SRIP trusted agent station 104 can change over time depending on the trusted agent employing the SRIP trusted agent station 104. In various embodiments, the agent profile can include certifications and/or accreditations regarding the trusted agent, specialty skills of the trusted agent (e.g., languages the trusted agent speaks, reads, and/or writes), specialty training completed by the trusted agent (e.g., training in identity proofing operations designed to meet the needs of persons with disabilities), a combination thereof, and/or the like.

The agent selector 409 can first filter the plurality pools based on one or more agent traits defined in the SRIP session request. From the filtered results, the agent selector 409 can further select a pool with the least number of active session allocations. Further, agent selector 409 can select a SRIP trusted agent station 104 with the least number of session allocations amongst those SRIP trusted agent stations 104 of the selected pool. In various embodiments, the agent selector 409 can follow a round-robin style selection process for SRIP session assignment to maintain a balanced allocation of SRIP sessions across all available SRIP trusted agent stations 104 and the trusted agents employing said SRIP trusted agent stations 104.

The message broker 410 can manage messages between the SRIP identity station 102 and SRIP trusted agent station 104 of a given SRIP session. For example, each of the SRIP identity stations 102 and SRIP trusted agent stations 104 can receive push notifications via the one or more control session channels 110 to ensure message delivery and/or sequencing. In various embodiments, the message broker 410 can utilize the one or more control session channels 110 as the primary notification channel for session control events, such as session termination.

When the SRIP identity station 102 and/or SRIP trusted agent station 104 connect to the one or more session control channels 110, the message broker 410 can negotiate a session identifier that is used to ensure message delivery. Between the SRIP identity station 102 and the SRIP trusted agent station 104 there are two primary points of potential communication failure: a network failure, and/or a failure with the SRIP identity station 102 and/or SRIP trusted agent station 104. The negotiated session identifier can be used to recover from a network failure. If a failure is the result of the SRIP identity station 102 and/or SRIP trusted agent station 104 itself, a new session identifier is negotiated and attempts to re-send the message can fail at the application layer. The message broker 410 can implement a message sequencing buffer to ensure message order when network fragmentation and packet reorder issues occur that cause the message packets to arrive unordered at the peer network and/or are ultimately dropped. For example, the message sequencing buffer can maintain a configurable window size, where "n" elements of the buffer are message identifiers that are monotonic values. For a first window (0, n), the window can hold ordered message identifiers between 0 and n. If the identifier n+a (e.g., where "a" is an integer, such as n+1, n+2, etc.) is received, the widow slides by a (e.g., slides by a to the right). After the window slides, if a message with identifier 0 is yet to arrive, it will be dropped by the receiver since it was received outside of the currently allowed window range. If a contiguous region "c" of message identifiers has been received and fills the left region of the window, the window can also slide to the right by c elements. In various embodiments, the message broker 410 can be embodied as web-based and/or desktop implementations for the message reorder logic.

As the one or more SRIP managers 106 establish and manage additional SRIP sessions, the operations of the SRIP managers 106 can scale accordingly; thereby requiring additional network bandwidth. For example, as the number of active SRIP sessions increases (e.g., as more SRIP identity stations 102 and/or SRIP trusted agent stations 104 are connected to a given SRIP manager 106), the more network bandwidth is required to facilitate the communication channels (e.g., the session control channels 110 and/or the multimedia channels 112) and/or the multimedia processing. In various embodiments, the one or more SRIP managers 106 can include built-in scalability features to allow the establishment of multiple simultaneous SRIP sessions (e.g., indirect connections between an SRIP identity station 102 and SRIP trusted agent station 104) to the one or more session control channels 110. In various embodiments, the SRIP manager can comprise two software layers. The first layer can be scalable and can allocate as many nodes as necessary to handle the network load. The second layer acts as a backplane to correctly relay messages between the nodes of the first layer to which the communicating SRIP identity station 102 and SRIP trusted agent station 104 can be connected.

As shown in FIG. 4, the one or more SRIP managers 106 can further include a multimedia module allocator 414, which can be configured to allocate worker modules 115 to service the multimedia streaming (e.g., across the multimedia channels 112) between SRIP identity stations 102 and SRIP trusted agent stations 104. For example, the multimedia module allocator 414 can maintain a pool of worker modules 115 to balance identity proofing operation tasks (e.g., multimedia processing, streaming, and/or recording) between a plurality of worker modules 115. For instance, the multimedia module allocator 414 can assign multiple worker modules 115 to facilitate multimedia streaming for the same SRIP session between an SRIP identity station 102 and SRIP trusted agent station 104. The multimedia module allocator 414 can allocate worker modules 115 via commands and/or instructions sent to the multimedia processing modules 108 via the one or more module control channels 114.

In various embodiments, the multimedia module allocator 414 can be configured to initially set a defined number of worker modules 115 to a given SRIP session and subsequently adjust the allocation (e.g., allocate additional worker modules 115 to the SRIP session, or deallocate one or more worker modules 115 to the SRIP session) based on changes in available network bandwidth of the system 100. Also, the multimedia module allocator 414 can be configured to initially set a defined number of SRIP sessions per worker module 115 and subsequently adjust the allocation (e.g., allocate additional SRIP sessions to the worker module 115) based on changes in available network bandwidth of the system 100. For instance, the worker module 115 allocation can be adjusted based on network bandwidth consumption rising above, or falling below, a defined threshold.

As shown in FIG. 1, the one or more worker modules 115 can establish separate communication channels (e.g., multimedia channels 112) with the one or more SRIP identity stations 102 and SRIP trusted agent stations 104 than the communication channels (e.g., session control channels 110) established between the one or more SRIP managers 106. For example, the worker modules 115 can relay multimedia data between an SRIP identity station 102 and SRIP trusted agent station 104 via the multimedia channels 112 separate from the session control channels 110, which can relay messages (e.g., push notification messages). Advantageously, relegation of the tasks of the worker modules 115 to a separate communication channel than the session control events can enable the system 100 to exhibit greater fault-tolerance should one or more of the worker modules 115 experience an error and/or an interrupted connection to the one or more networks.

In accordance with various embodiments described herein, the worker modules 115 can relay multimedia data between the SRIP identity station 102 and the SRIP trusted agent station 104 of an SRIP session, along with real-time (or near real-time) statistics characterizing the quality of data transfer. For example, the one or more worker modules 115 can support the transport protocol for real-time applications ("RTP") for the transfer of multimedia data (e.g., multimedia frames) between the SRIP identity station 102 and the SRIP trusted agent station 104. For example, the one or more worker modules 115 can support a RTP characterized by Request for Comment ("RFC") 3550 of the Internet Society (2003). Additionally, the RTP can support a control protocol ("RTCP") to maintain the quality of service of the data transfer. For instance, the control protocol can provide real-time statistics regarding, for example: packet count, packet loss, delay time, a combination thereof, and/or the like. In various embodiments, the protocols employed by the one or more worker modules 115 can enable adaptive streaming between the SRIP identity station 102 and SRIP trusted agent station 104 (e.g., along the one or more multimedia channels 112, where the one or more worker modules 115 serve as a relay).

In various embodiments, the one or more worker modules 115 can support a session description protocol (e.g., compatible with Session Description Protocol ("SDP") standard) that can enable negotiations between the SRIP identity station 102, SRIP trusted agent station 104, and/or worker module 115 regarding characteristics of the multimedia data transfer via the one or more multimedia channels 112. For instance, the one or more worker modules 115 can support a SDP characterized by RFC 4566 of the Internet Society (2006). For example, the session description protocol can be employed with other protocols of the worker modules 115 (e.g., with the RTP protocols described herein) to negotiate the parameters of multimedia streams (e.g., video and/or audio data) across the one or more multimedia channels 112. For instance, the one or more worker modules 115 can utilize the session description protocol to enable the SRIP client 102 and/or SRIP operator 104 of an orchestrated SRIP session to announce their capabilities (e.g., supported codecs, video resolution, network ports, and/or the like) and agree on a common set of parameters to use for the SRIP session communications across the one or more multimedia channels 112. Once the matched SRIP client 102 and SRIP operator 104 agree on the supported capabilities, one or more multimedia channels 112 can be established and/or maintained by the one or more worker modules 115 based on the mutually negotiated multimedia capabilities.

Advantageously, utilizing the worker modules 115 as a relay can enable the system 100 to maintain a recording of the multimedia data streams of the SRIP session. In various embodiments, SRIP session recordings can be optional, secured for each end-to-end transaction, encrypted, and sent to the system 100 owner for archiving. For example, the one or more worker modules 115 can implement one or more connectivity protocols compatible with in Interactive Connectivity Establishment ("ICE") protocols. For instance, the one or more worker modules 115 can implement connectivity protocols compatible with ICE, as characterized by RFC 5245 of the Internet Society (2010). Network address translation ("NAT") and/or firewalls can render it challenging to establish direct peer-to-peer communications; however, the one or more worker modules 115 can execute ICE compatible connectivity protocols to traverse said challenges. In various embodiments, the one or more worker modules 115 can include one or more ICE controllers to monitor one or more networks of the system 100 to negotiate, and/or renegotiate, connectivity with the one or more SRIP identity stations 102 and/or SRIP trusted agent stations 104 to maintain the multimedia data stream across the one or more multimedia channels 112.

In various embodiments, the one or more worker modules 115 can further monitor the quality of the multimedia data across the one or more multimedia channels 112 to ensure data transfer reliability. For example, the one or more worker modules 115 can monitor one or more statistics reported by the control protocol to detect and/or address multimedia data transfer issues, including, but not limited to: packet drops, picture loss, a combination thereof, and/or the like. For instance, the one or more worker modules 115 can request new multimedia frames based on a detected picture and/or audio loss. Similarly, in one or more embodiments the SRIP identity stations 102 and/or SRIP trusted agent stations 104 can also request new multimedia frames based on data transfer issues reported by the control protocol of the worker modules 115. Additionally, the one or more worker modules 115 can implement one or more encryption protocols to provide data security and/or privacy to the multimedia data transfer. For example, multimedia data transfers across the one or more multimedia channels 112 can be encrypted with a Triple-DES (3DES) key in secure CBC mode.

In various embodiments, the one or more media processing modules 108 can include one or more worker modules 115 configured to record the multimedia data streams from each connection with the SRIP identity station 102 and/or SRIP trusted agent station 104 of an SRIP session in a durable and/or persistent storage for later transcoding. For instance, the one or more worker modules 115 can record the receipt time and/or date of each stored multimedia frame relative to the original multimedia frame (e.g., received from the SRIP identity station 102) and the moment of session initialization. Thereby, the one or more worker modules 115 can utilize the recorded receipt time and reference data to reconstruct the multimedia data for playing on the SRIP identity station 102 and/or SRIP trusted agent station 104. For instance, the one or more worker modules 115 can be configured to construct digital media files from multimedia frames received from an SRIP identity station 102 and/or SRIP trusted agent 104 during an SRIP session.

Additionally, a pool of recording modules 116 can be maintained separate from a pool of worker modules 115. For instance, in one or more embodiments the multimedia module allocator 414 can allocate a recording module 116 to each SRIP session, where the allocated recording module 116 can transcode multimedia frames of the given SRIP session. Further, the allocated record module 116 can retrieve multimedia frame information (e.g., encoder settings used to encode the multimedia frames) from session metadata information stored in a session database 118. The recording module 116 can utilize the multimedia frame information (e.g., encoder settings) to decode the multimedia frame and re-encode the multimedia frames with a media encoder that is storage efficient.

In accordance with various embodiments described herein, the system 100 can be comprised of a plurality of networks, where the one or more multimedia processing modules 108 can be hosted on one or more separate networks from the one or more SRIP managers 106; thereby facilitating the scalability of the system 100 described herein. For example, an SRIP manager 106 can allocate one or more multimedia processing modules 108 to service one or more SRIP sessions managed by the SRIP manger 106. As the SRIP manager 106 manages additional SRIP sessions, the SRIP manager 106 can monitor the amount of network resources utilized by the allocated multimedia processing modules 108, referred to herein as "network consumption." Where the SRIP manager 106 determines that the network consumption is greater than a defined threshold, the SRIP manager 106 can allocate one or more additional multimedia processing modules 108, hosted by another network, to service one or more of the SRIP sessions managed by the SRIP manager 106 (e.g., to perform one or more multimedia data processing, recording, and/or streaming functions described herein).

For instance, the network bandwidth for a respective multimedia processing module 108 can be less than the bandwidth of the multimedia processing module's 108 host network (e.g., due to resource sharing, limitations of the worker module 115, network policies, hardware constraints, protocol overhead, and/or the like); therefore, the multiple multimedia processing modules 108 can operate within the same host network. As more multimedia processing modules 108 are allocated to SRIP sessions, the one or more SRIP managers 106 can monitor the network consumption of the network hosting the allocated multimedia processing modules 108. Where the network consumption exceeds a defined threshold, the one or more SRIP managers 106 can allocate additional multimedia processing modules 108 from other networks (e.g., external to initial host network) to scale the computing processes performed by the worker modules 115. In various embodiments, the one or more SRIP managers 106 can utilize one or more cloud computing environments to scale the computing processes of the multimedia processing modules 108 to one or more external networks (e.g., external to the network of the SRIP managers 106).

Figure 5:
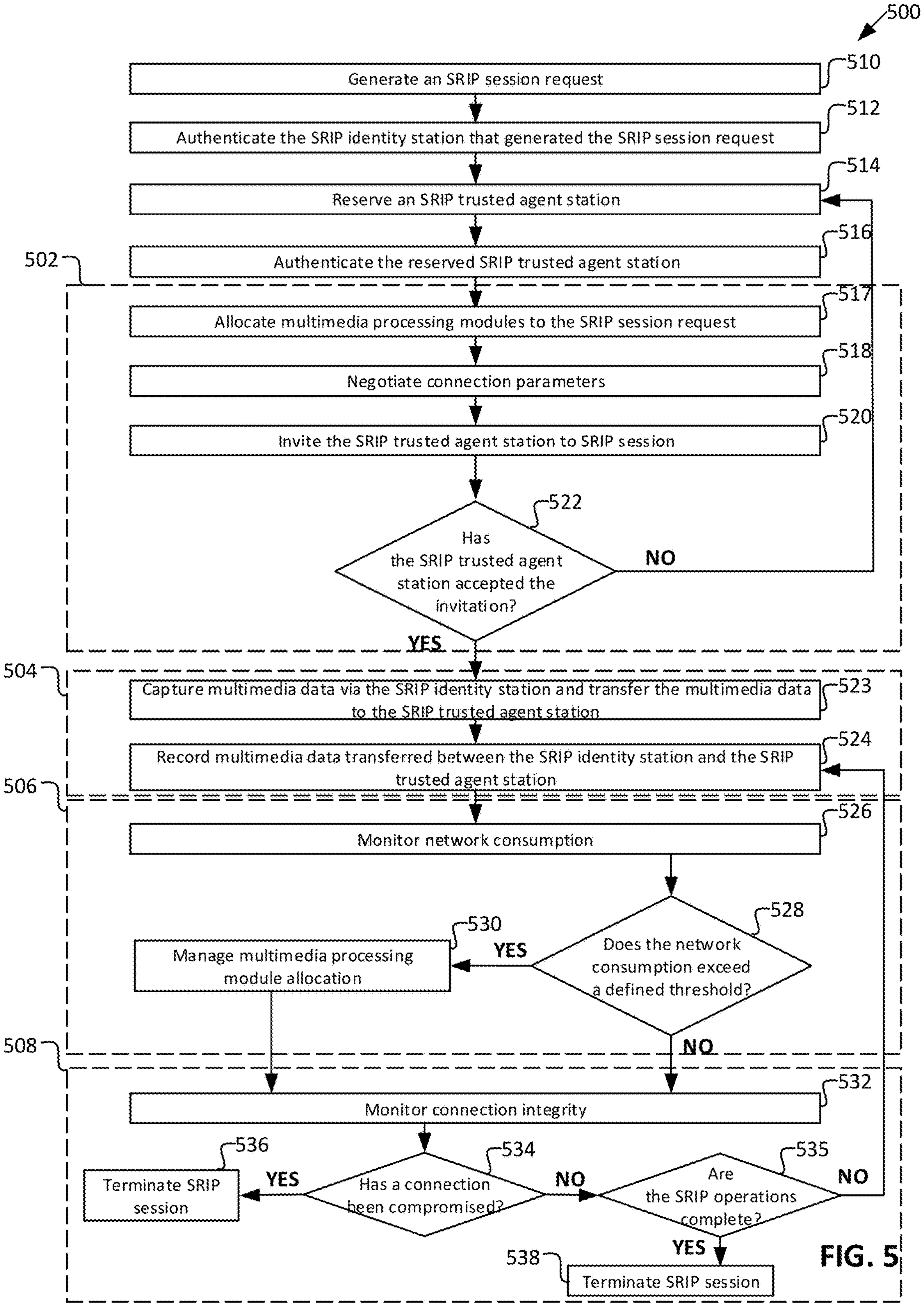
FIG. 5 is a flow diagram of a non-limiting example computer-implemented method that can be implemented by one or more systems to execute one or more SRIP sessions managed by one or more SRIP managers and/or serviced by one or more multimedia processing modules in accordance with one or more embodiments described herein.

In view of the foregoing structural and functional features described above, an example method will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 5 depicts a flow diagram of a non-limiting example computer-implemented method 500) that can be implemented by the system 100 in accordance with one or more embodiments described herein. For example, an SRIP session facilitated by the system 100 can be characterized by four stages: session preparation 502, session establishment 504, session management 506, and/or session termination 508.

At 510, the computer-implemented method 500 can comprise generating (e.g., via session request generator 209), by one or more processing units (e.g., identity station processing units 202) operatively coupled to the system 100, an SRIP session request. As described herein, an applicant 103 of the system 100 can employ the SRIP identity station 102 to generate the SRIP session request. For example, the applicant 103 can utilize an SRIP identity station 102 (e.g., such as an identity station embodied as a computer terminal and/or kiosk) to indicate a willingness to participate in one or more identity proofing operations to verify, validate, and/or proof the applicant's identity. Advantageously, a variety of SRIP identity station 102 architectures can be employed with the system 100. For example, the SRIP identity station 102 can be a dedicated identity proofing station, a mobile computing device (e.g., a smart phone, smart tablet, smart watch, and/or the like), a laptop, and/or a desktop computer.

In various embodiments, the applicant 103 can utilize one or more data collection equipment 216 to enter user input data that define one or more operator traits used to reserve an SRIP trusted agent station 104. Example applicant 103 defined operator traits that can be included in the session request and used to reserve an SRIP trusted agent station 104 can include, but are not limited to: a defined language, a defined geographical location, association with a defined entity, defined network or hosted domains, security clearance, security level of the SRIP session, time of the SRIP session, a combination thereof, and/or the like. For instance, the user can utilize the SRIP identity station 102 to define a preference for an SRIP trusted agent station 104 associated with a trusted agent 105 that is fluent in a defined language (e.g., English). In a further instance, the applicant 103 can utilize the SRIP identity station 102 to define a preference for an SRIP trusted agent station 104 associated with a defined entity (e.g., an SRIP trusted agent station 104 associated with a defined corporate or government entity). In various embodiments, the session request generator 209 can generate the session request based on the applicant 103 input data and send the session request to one or more SRIP managers 106 (e.g., via one or more session control channels 110).

In one or more embodiments, the applicant 103 can utilize the SRIP identity station 102 to define a preference for an SRIP trusted agent station 104 that can effectuate an SRIP session tailored to address one or more disabilities defined in the Americans with Disabilities Act. For example, the applicant 103 can utilize the SRIP identity station 102 to define a preference for an SRIP trusted agent station 104 associated with a trusted agent 105 that is fluent in sign language. In another example, the applicant 103 can utilize the SRIP identity station 102 to define a preference for an SRIP trusted agent station 104 associated with a trusted agent 105 trained to assist blind people through the identity proofing operations.

At 512, the computer-implemented method 500 can comprise authenticating (e.g., via the identity station authenticator 210 and/or authenticator 408), by the system 100, the SRIP identity station 102 that generated the SRIP session request. In accordance with one or more embodiments described herein, further operations of the SRIP manager 106 can be predicated on authentication of the SRIP identity station 102 and/or the SRIP session request. In various embodiments, the authentication at 512 can be performed via a dual-certificate authentication protocol (e.g., mutual transport layer security "mTLS"), wherein the SRIP identity station 102 verifies (e.g., via the identity station authenticator 210) the SRIP manager's 106 identity and the SRIP manager 106 verifies (e.g., via authenticator 408) the SRIP identity station's 102 identity using digital certificates (e.g., in compliance with X.509 Public Key Infrastructure (PKI) standard). Once the mutual authentication is accomplished, an encrypted communication channel (e.g., an encrypted session control channel 110) can be established using the TLS protocol. Where the authentication is accomplished, the computer-implemented method 500 can proceed to feature 514. Where the SRIP identity station 102 fails authentication at 512, the SRIP manager 106 can terminate the computer-implemented method 500.

At 514, the computer-implemented method 500 can comprise reserving (e.g., via the trusted agent selector 409), by the system 100, an SRIP trusted agent station 104 to participate the requested SRIP session. In accordance with one or more embodiments described herein, the system 100 can comprise multiple pools of SRIP trusted agent stations 104, where each operator pool includes SRIP trusted agent stations 104 having one or more traits in common. The SRIP manager 106 can select an operator pool based on the SRIP session request generated at 510. For instance, where the applicant 103 defined a preference for English, the SRIP session request can delineate said English preference and SRIP manager 106 can filter the operator pools to identify operator pools comprising SRIP trusted agent stations 104 associated with trusted agents 105 fluent in English. Further, the SRIP manager 106 can select a trusted agent pool from the filtered operator pools that has the least number of active SRIP session allocations. For example, the SRIP manager 106 can select the least congested operator pool from the filtered operator pools. Further, the SRIP manager 106 can reserve an SRIP trusted agent station 104 from the selected operator pool based on, for example, an allocation schedule and/or the number of allocated SRIP sessions per SRIP trusted agent 104.

As described herein, each SRIP trusted agent station 104 can be allocated to multiple SRIP sessions for a given time period; thereby, a single identify verifier can proctor multiple identity proofing operations to verify the identity of multiple applicants 103 simultaneously, or near simultaneously. In one or more embodiments, the trusted agent selector 409 can select an SRIP trusted agent station 104 for reservation in accordance with a schedule that can define: the selection order of SRIP trusted agent stations 104 of a given operator pool, the latest SRIP trusted agent station 104 selected, the number of SRIP sessions currently allocated to each SRIP trusted agent 104, and/or the availability of each SRIP trusted agent 104.

At 516, the computer-implemented method 500 can comprise authenticating (e.g., via authenticator 408), by the system 100, the reserved SRIP trusted agent station 104. In accordance with one or more embodiments described herein, further operations of the SRIP manager 106 can be predicated on authentication of the SRIP trusted agent station 104. In various embodiments, the authentication at 516 can also be performed via a dual-certificate authentication protocol (e.g., mTLS), wherein the reserved SRIP trusted agent station 104 verifies the SRIP manager's 106 identity and the SRIP manager 106 verifies (e.g., via authenticator 408) the SRIP trusted agent station identity using digital certificates. Once the mutual authentication is accomplished, an encrypted communication channel (e.g., an encrypted session control channel 110) can be established using the TLS protocol. Where the authentication is accomplished, the computer-implemented method 500 can proceed to feature 518. Where the SRIP trusted agent station 104 fails authentication at 516, the SRIP manager 106 can reserve another SRIP trusted agent station 104 at 514 and attempt to authenticate the newly selected SRIP trusted agent station 104 at 516.

As shown in FIG. 5, the session preparation 502 can include at least features 517-522. At 517, the computer-implemented method 500 can comprise allocating (e.g., via multimedia module allocator 414), by the system 100, multimedia processing modules 108 to the SRIP session request. For example, the SRIP manager 106 can utilize one or more module control channels 114 to assign one or more multimedia processing modules 108 to service the SRIP session request. As described herein, the one or more multimedia processing modules 108 can be hosted on a separate network and/or computing environment than the SRIP manager 106. In one or more embodiments, the multimedia module allocator 414 can allocate one or more multimedia processing modules 108 based on the SRIP session request. For example, the multimedia module allocator 414 can assign one or more multimedia processing modules 108 anticipated to establish the most reliable communication channel with the SRIP identity station 102 generating the session request (e.g., the allocated multimedia processing modules 108 can be within the same defined geographical region as the SRIP identity station 102).

At 518, the computer-implemented method 500 can comprise negotiating (e.g., via the one or more worker modules 115), by the system 100, session parameters for the requested SRIP session. As described herein, the one or more allocated multimedia processing modules 108 can execute a session description protocol to enable negotiation of session parameters (e.g., multimedia streams, media encoders, multimedia frame rates, and/or the like) between the allocated multimedia processing modules 108, the reserved SRIP trusted agent 104, and/or the SRIP identity station 102 that generated the SRIP session request.

For example, at 518 the SRIP identity station 102 can request specific multimedia adapters to be used for multimedia streaming (e.g., screen sharing and/or video conferencing) with the SRIP trusted agent station 104. The SRIP identity station 102 can request from the one or one or more multimedia processing modules 108 an instance of each type of multimedia adapter to be utilized by the SRIP session and set up said multimedia adapters in preparation for the SRIP session.

At 520, the computer-implemented method 500 can comprise inviting (e.g., via the SRIP manager 106), by the system 100, the reserved SRIP trusted agent station 104 to the requested SRIP session. For example, once the SRIP identity station 102 establishes a connection to the SRIP manager 106 (e.g., via the SRIP session request), the SRIP trusted agent station 104 is reserved, and the multimedia capabilities are negotiated; the SRIP manager 106 can forward the SRIP session request to the reserved SRIP trusted agent station 104. For instance, the SRIP session request along with associated session metadata (e.g., characterizing the SRIP identity station 102, one or more multimedia processing modules 108, and/or session parameters) can be sent to the SRIP trusted agent station 104 with an invitation to join the SRIP session.

At 522, the computer-implemented method 500 can comprise determining (e.g., via the SRIP manager 106), by the system 100, whether the SRIP trusted agent station 104 has accepted the invitation to join the SRIP session. Where the SRIP trusted agent station 104 accepts the invitation, one or more multimedia channels 112 between the SRIP trusted agent station 104 and the one or more multimedia processing modules 108 can be established and the computer-implemented method 500 can proceed to 524. For example, upon accepting the invitation, the SRIP trusted agent station 104 can utilize the multimedia adapters selected by the SRIP identity station 102 at 518 to facilitate streaming multimedia data between the SRIP identity station 102 and SRIP trusted agent station 104. Where the SRIP trusted agent station 104 rejects the invitation, the computer-implemented method 500) can return to 514 and a new SRIP trusted agent station 104 can be reserved and/or authenticated.

As shown in FIG. 5, the session establishment 504 can include at least features 523-524. At 523, the computer-implemented method 500 can comprise capturing (e.g., via data collection equipment 216) multimedia data via the SRIP identity station 102 and transferring (e.g., via the one or more worker modules 115), by the system 100, the multimedia data to the SRIP trusted agent station 104. For example, text, image, video, and/or audio data can be streamed from the data collection equipment 216 of the SRIP client 102 and across the one or more multimedia channels 112.

For instance, video data can be captured by one or more cameras of the data collection equipment 216 and streamed via the multimedia channels 112 for display by the SRIP trusted agent station 104. In various embodiments, the captured multimedia data (e.g., captured video data) can be presented by the SRIP trusted agent station 104 in real-time, or near real-time. Additionally, the captured multimedia data (e.g., captured video data) can be archived and retrieved by the SRIP trusted agent station 104 at a later time. The video data can capture images of an environment surrounding the SRIP identity station 102, including images of a user operating the SRIP identity station 102. In another instance, audio data can be captured by one or more microphones of the data collection equipment 216 and streamed via the multimedia channels 112 for presentation by the SRIP trusted agent station 104 and/or remote listening by the trusted agent. The audio data can capture sounds propagating through the environment surrounding the SRIP identity station 102, including speech by an applicant 103 operating the SRIP identity station 102. In a further instance, text data can be captured by one or more keyboards of the data collection equipment 216 and streamed via the multimedia channels 112 for presentation by the SRIP trusted agent station 104. The text data can include symbols, words, sentences, and/or the like entered by a user operating the SRIP identity station 102. In a still further instance, biometric data can be captured by one or more sensors and/or scanners of the data collection equipment 216 and streamed via the multimedia channels 112 for presentation by the SRIP trusted agent station 104. The biometric data can include facial recognition data, fingerprint scan data, voice recognition data, iris and/or retina scan data and/or the like that characterize one or more traits (e.g., physical traits) of an applicant 103 operating the SRIP identity station 102. In another instance, documentation data can be captured by one or more cameras and/or scanners of the data collection equipment 216 and streamed via the multimedia channels 112 for presentation by the SRIP trusted agent station 104. The documentation data can include images and/or scans of identification documents issued by a recognized authority (e.g., identification documents such as a driver's license, passport, employee ID, college ID, and/or the like) and associated with the applicant 103 of the SRIP identity station 102.

As described herein, the one or more multimedia data processors 108 can serve as a relay along the multimedia channels 112 to facilitate transferring the multimedia data from the SRIP identity station 102 to the SRIP trusted agent station 104 and vice versa. For example, the multimedia data can be presented to one or more trusted agents 105 via one or more consoles (e.g., example console 300) generated by the SRIP trusted agent station 104. In accordance with various embodiments described herein, the trusted agents 105 can utilize the multimedia data to verify, validate, and/or proof the alleged identity of an applicant 103 employing the SRIP identity station 102. For example, video and/or imaging data captured during the SRIP session can be compared to documentation data provided by the applicant 103. In another example, video and/or imaging data captured during the SRIP session can be compared to one or more reference images associated with the alleged applicant 103 identity (e.g., facial recognition techniques can be executed via the SRIP trusted agent station 104 to ascertain similarities and differences between captured video data of the user and stored reference images associated with the identity alleged by the applicant 103). In a further example, biometric data captured during the SRIP session can be compared to reference biometric data associated with the alleged applicant 103 identity.

In various embodiments, the SRIP trusted agent station 104 can prompt and/or instruct the trusted agent 105 in multimedia data on which data to collect and/or on which identity verification steps to execute (e.g., via a console, such as example console 300). Additionally, to facilitate the identity verification process, the SRIP manager 106 can control the data collection equipment 216 of the SRIP identity station 102. For example, the trusted agent can employ the SRIP trusted agent station 104 to activate, rotate, re-align, and/or otherwise manipulate one or more cameras, lights, and/or microphones of the data collection equipment 216. For instance, in one or more embodiments the SRIP trusted agent station 104 can control the data collection equipment 216 so as to collect image, video, and/or audio data regarding a perspective around the SRIP identity station 102 ranging from, for example, about 180 degrees to 360 degrees (e.g., all around the SRIP client 102). Thereby, the SRIP trusted agent station 104 can control the data collection equipment 216 to collect multimedia data characterizing the real-time, or near real-time, state of the environment (and persons therein) surrounding the SRIP identity station 102. For example, in one or more embodiments the SRIP trusted agent station 104 can control 180 and 360 degree video surveillance to capture multimedia data of the entire, or nearly entire, physical form the SRIP identity station 102 (e.g., to ensure unit and/or session integrity). For instance, in one or more embodiments the SRIP trusted agent station 104 can activate and/or control one or more cameras (e.g., dual 180 degree cameras, multiple variable angle cameras, and/or the like) of the data collection equipment 216 to execute workflow steps of the identity proofing operations (e.g., presented via the example console 300) to ensure integrity of the SRIP session and/or user conformance with the identity proofing operations.

In one or more embodiments, the SRIP identity station 102 can be employed to prompt an applicant 103 to provide applicant input data and/or identification data that can initiate one or more SRIP workflows. For example, the applicant 103 can be prompted to provide a QR code for scanning by the data collection equipment 216, where the data encoded by the QR code can be utilized by the SRIP identity station 102 to retrieve one or more SRIP workflows relevant to verifying the applicant's 103 identity. Additionally, the SRIP trusted agent station 104 can display the one or more retrieved workflows to the trusted agent 105 via a generated console (e.g., via the workflow steps panel 310 of the example console 300). In another example, the applicant 103 can be prompted to provide a unique identifier (e.g., a name and/or an identification number) to facilitate retrieval of an SRIP workflow by the SRIP identity station 102. For instance, the SRIP identity station 102 can access one or more workflow databases comprising defined workflows (e.g., identity proofing operation steps) associated with established identities.

In one or more embodiments, the SRIP trusted agent station 104 and/or SRIP identity station 102 can retrieve one or more workflows from the workflow database based on one or more characteristics defined in the SRIP session request. For example, where the SRIP session request delineates a preference for a SRIP session tailored to support an applicant 103 with disabilities, the one or more retrieved workflows can include audio and/or video navigation assistance (e.g., audio and/or video prompts for instructing the user in various means of data collection).

For example, the SRIP identity station 102 can maintain deployed workflows, where a target workflow can be selected based on an applicant selection, QR code, presented data, a combination thereof, and/or the like. Further, one or more characteristics of the assigned workflow can determine if a specified SRIP managed, or proctored, session is required. For instance, a PIV workflow for IAL-3 requires an end-to-end SRIP managed session, where the trusted agent employs the SRIP trusted agent station 104 to observe the entire workflow interaction between the applicant 103 and SRIP identity station 102. In another instance, the target workflow may not mandate supervision by the trusted agent; however, a managed SRIP session can still be specified based on the applicant's 103 request for assistance from a trusted agent 105 (e.g., via a connection between the SRIP identity station 102 and SRIP trusted agent station 104, as managed by the SRIP manager 106).

In various embodiments, the multimedia data can include customer support communications between the SRIP identity station 102 and the SRIP trusted agent station 104. For example, an applicant 103 can employ the SRIP identity station 102 to ask the trusted agent 105 one or more questions pertaining to operation of the SRIP identity station 102 and/or the identity proofing operations. For instance, the trusted agent 105 can employ the SRIP trusted agent station 104 to remotely assist the applicant 103 in executing one or more identity proofing operations.

At 524, the computer-implemented method 500 can comprise recording (e.g., via one or more recording modules 116), by the system 100, multimedia data transferred between the SRIP identity station 102 and the SRIP trusted agent station 104. As described herein, the multimedia data transfers across the multimedia channels 112 to effectuate the identity proofing can be recorded by one or more recording modules 116. For example, the recording modules 116 can store time-stamped copies of multimedia frames generated by the SRIP identity station 102 in one or more session databases 118. Further, the recording modules 116 can reformat the multimedia recordings into a compressed state to facilitate storage. In various embodiments, the multimedia recordings can be utilized by the multimedia processing modules 108 to document the SRIP session and/or reconstruct a multimedia stream in response to a multimedia channel 112 interruption. For instance, the multimedia processing modules 108 can archive, playback, and/or compress the multimedia data of the SRIP sessions (e.g., where multimedia data is recorded, the data can be compressed and archived for subsequent playback operations).

As shown in FIG. 5, the session management 506 can include at least features 526-530. At 526, the computer-implemented method 500 can comprise monitoring network congestion amongst the computer environment hosing the one or more multimedia processing modules 108. As described herein, the one or more multimedia processing modules 108 can be hosted on a separate computer environment than the SRIP manager 106, the SRIP identity station 102, and/or the SRIP trusted agent station 104. As computation demand of the multimedia processing modules 108 increases and bandwidth of the hosting network decreases, the SRIP manager 106 can allocate additional multimedia processing modules 108 to the SRIP session in order to disburse the computational workload. Further, the additionally allocated multimedia processing modules 108 can be hosted on one or more computing environments distinct from the initial multimedia processing module 108 allocation. Thereby, a plurality of multimedia processing modules 108 can be allocated to a given SRIP session, with the multimedia processing modules 108 being a part of a distributed computing architecture across multiple hosting networks.

For example, at 528 the computer-implemented method 500 can comprise determining whether the network consumption monitored at 526 exceeds a defined threshold. Where network consumption does exceed the defined threshold, the computer-implemented method 500 can proceed to 530. At 530, the computer-implemented method 500 can comprise managing (e.g., via the multimedia module allocator 414), by the system 100, the multimedia processing module 108 allocation. For example, additional multimedia processing modules 108 can be allocated to the SRIP session to scale the computational capacity of the system 100 and/or reduce network congestion. Where the network consumption does not exceed the defined threshold, the computer-implemented method 500 can proceed to 532.

As shown in FIG. 5, the session termination 508 can include at least features 532-538. At 532, the computer-implemented method 500 can comprise monitoring (e.g., via the SRIP manager 106), by the system 100, connection integrity amongst the one or more session control channels 110. In various embodiments, throughout the duration of the SRIP session, the SRIP identity station 102 and the SRIP trusted agent station 104 can maintain an active heartbeat exchange using the one or more control session channels 110. As used herein, the term "heartbeat" can refer to a type of communication packet sent between the SRIP identity station 102 and the SRIP manager 106 and/or the SRIP trusted agent station 104 and the SRIP manager 106. The heartbeat exchange can be utilized by the one or more SRIP managers 106 to continually monitor the integrity of the connections with the SRIP identity station 102 and with the SRIP trusted agent station 104. For instance, the SRIP manager 106 can send heartbeat messages to the SRIP identity station 102 and the SRIP trusted agent station 104 at defined intervals, and expect to receive heartbeat messages from the SRIP identity station 102 and the SRIP trusted agent station 104 at defined intervals. For instance, the SRIP identity station 102 and/or SRIP trusted agent station 104 can be configured to respond to the heartbeat message with an acknowledgement heartbeat message. The heartbeat exchange can be utilized by the SRIP manager 106 to determine whether the SRIP identity station 102 and/or the SRIP trusted agent station 104 have been disconnected from the SRIP session. For instance, the heartbeat exchange can be utilized by the SRIP manager 106 to ascertain connection robustness between the SRIP identity station 102 and the SRIP trusted agent station 104.

For instance, heartbeat messages generated by the SRIP identity station 102, the SRIP trusted agent station 104, and/or the SRIP manager 106 can be secured by mTLS. In another instance, the heartbeat messages can include a timestamp and/or nonce. Receipt of an out dated heartbeat message can be indicative of a replay security concern. In a further instance, changes in heartbeat exchange patterns can indicate hardware failure, network issues, and/or potentially malicious activities.

For example, at 534 the computer-implemented method 500 can comprise determining (e.g., via the SRIP manager 106), by the system 100, whether a connection with the SRIP identity station 102 and/or SRIP trusted agent station 104 has failed. Reception of the heartbeat messages in accordance with the defined intervals can be indicative of proper connection integrity; whereas the absence of a received heartbeat message can be indicative of a failure. Where the connection with the SRIP identity station 102 and/or SRIP trusted agent station 104 is determined to be healthy, the computer-implemented method 500 can proceed to 535.

In contrast, a determination that the connection with the SRIP identity station 102 and/or the SRIP trusted agent station 104 has failed can result in termination of the SRIP session. Where the heartbeat exchange fails due to a lack of connection with the SRIP identity station 102 and/or the SRIP trusted agent station 104, the SRIP manager 106 may delay terminating the SRIP session for a defined length of time to allow the SRIP identity station 102 and/or SRIP trusted agent station 104 an opportunity to reestablish a connection to the session control channel 110. In one or more embodiments, the SRIP manager 106 can notify the SRIP trusted agent station 104 when the connection of the SRIP identity station 102 is interrupted. Upon receiving a notification of the SRIP identity station's 102 connection interruption, the SRIP trusted agent station 104 can indicate a willingness to wait for the SRIP identity station 102 to reconnect or to terminate the SRIP session. Alternatively, a disconnection to the one or more session control channels 110 can result in the computer-implemented method 500) immediately proceeding to 536 to terminate the SRIP session.

Termination of the SRIP session by the SRIP manager 106, and/or network disconnections, as a result of identifying a failed connection at 534 can be referred to herein as an "ungraceful termination." As a result of an ungraceful termination, the SRIP identity station 102 and/or the SRIP trusted agent station 104 can store a local session state into a durable and persistent storage. Upon the earliest restoration of connectivity by the SRIP identity station 102 and/or SRIP trusted agent station 104, the SRIP identity station 102 and/or SRIP trusted agent station 104 can notify the SRIP manager 106 that the SRIP session should be terminated. The terminated state for a session is the final state; thus, multiple requests to terminate an already terminated SRIP session can be expected.

At 535, the computer-implemented method 500 can determine (e.g., via the SRIP manager 106), by the system 100, whether the identity proofing operations are complete. For example, the SRIP trusted agent station 104 can notify the SRIP manager 106 once the user as passed or failed identity verification. Where the identity proofing operations are still on-going (e.g., absent a notification of completion by the SRIP trusted agent station 104), the computer-implemented method 500 can proceed back to 524; whereupon the one or more multimedia processing modules 108 can continue to record the multimedia streams of the SRIP session, and the SRIP manager 106 can continue to monitor network consumption and manage computer resource allocations. Where the identity proofing operations are determined to be complete at 535, the computer-implemented method 500 can proceed to 538 to terminate the SRIP session.

A termination of the SRIP session resulting from a culmination of the identity proofing operations (e.g., such as the termination at 538) can be referred to herein as a "graceful termination" (e.g., where the end of the workflow is achieved). A graceful termination can be facilitated by either the SRIP identity station 102 or SRIP trusted agent station 104 notifying the other with a request to terminate the SRIP session using the session control channel 110 through the SRIP manager 106. Based on the termination request, the SRIP identity station 102 and/or the SRIP trusted agent station 104 can close its connections with the one or more multimedia processing modules 108 and deallocate any resources that are used for multimedia transfer. In turn, the SRIP manager 106 can set the final state of the SRIP session to be terminated and can orchestrate a job to transcode the recorded media frames into a final video recording.

The one or more processing units (e.g., identity station processing units 202 and/or manager processing units 402) can comprise any commercially available processor. For example, the one or more processing units described herein can be a general-purpose processor, an application-specific system processor ("ASSIP"), an application-specific instruction set processor ("ASIPs"), or a multiprocessor. For instance, the one or more processing units described herein can comprise a microcontroller, microprocessor, a central processing unit, and/or an embedded processor. In one or more embodiments, the one or more processing units described herein can include electronic circuitry, such as: programmable logic circuitry, field-programmable gate arrays ("FPGA"), programmable logic arrays ("PLA"), an integrated circuit ("IC"), and/or the like.

The one or more computer readable storage media (e.g., identity station computer readable storage media 204 and/or manager computer readable storage media 404) can include, but are not limited to: an electronic storage device, a magnetic storage device, an optical storage device, an electromagnetic storage device, a semiconductor storage device, a combination thereof, and/or the like. For example, the one or more computer readable storage media described herein can comprise: a portable computer diskette, a hard disk, a random access memory ("RAM") unit, a read-only memory ("ROM") unit, an erasable programmable read-only memory ("EPROM") unit, a CD-ROM, a DVD, Blu-ray disc, a memory stick, a combination thereof, and/or the like. The computer readable storage media described herein can employ transitory or non-transitory signals. In one or more embodiments, the computer readable storage media can be tangible and/or non-transitory. In various embodiments, the one or more computer readable storage media can store the one or more computer executable instructions and/or one or more other software applications, such as: a basic input/output system ("BIOS"), an operating system, program modules, executable packages of software, and/or the like.

The one or more computer executable instructions (e.g., identity station computer executable instructions 206 and/or manager computer executable instructions 406) can be program instructions for carrying out one or more operations described herein. For example, the one or more computer executable instructions described herein can be, but are not limited to: assembler instructions, instruction-set architecture ("ISA") instructions, machine instructions, machine dependent instructions, microcode, firmware instructions, state-setting data, configuration data, source code, object code, a combination thereof, and/or the like. For instance, the one or more computer executable instructions can be written in one or more procedural programming languages. Although FIGS. 2 and 4 depict the computer executable instructions stored on computer readable storage media, the architecture of the system 100 is not so limited. For example, the one or more computer executable instructions can be embedded in the one or more processing units.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 6. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, quantum computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 6:
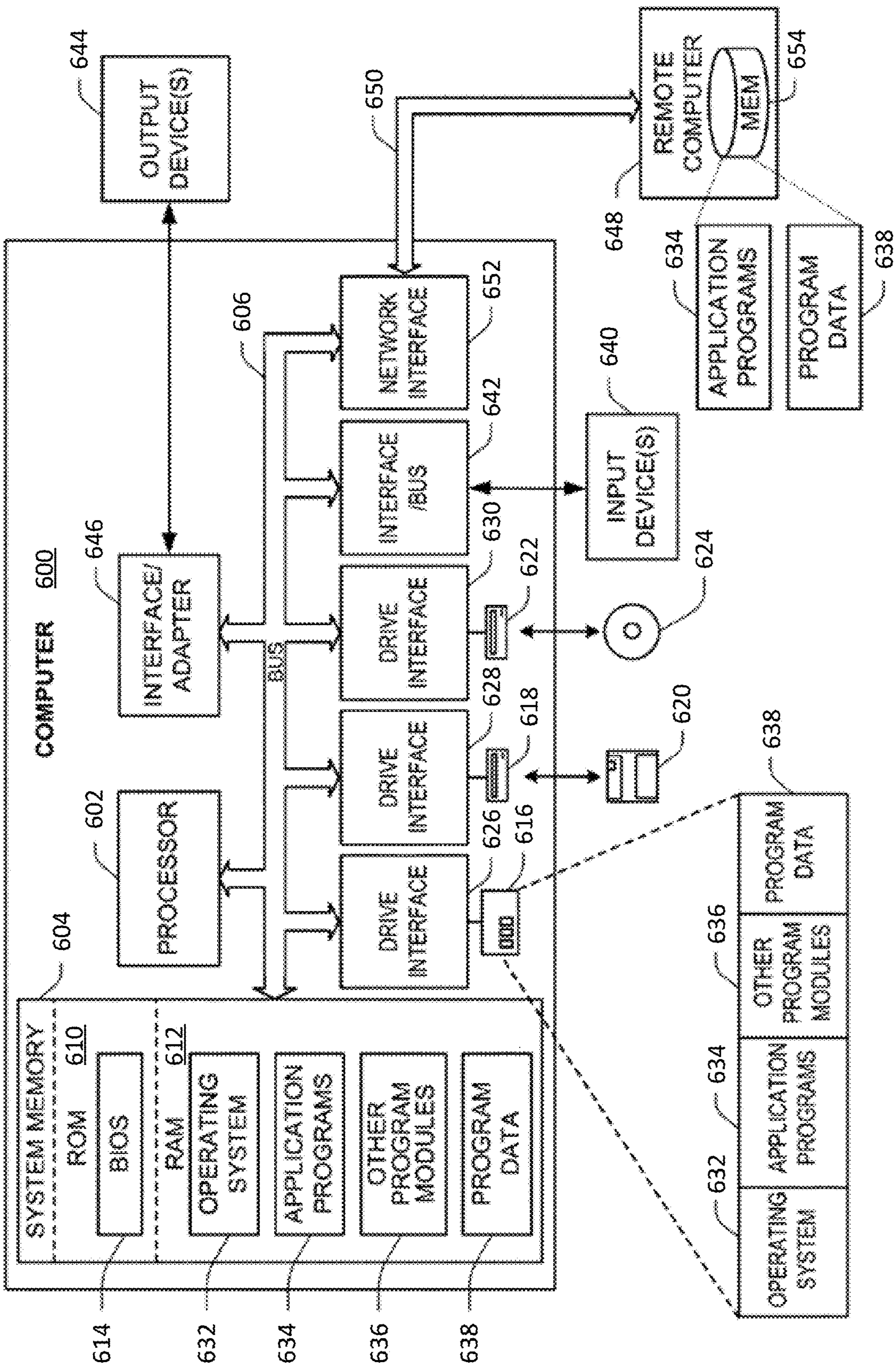
FIG. 6 illustrates a block diagram of non-limiting example computing environment that can be implemented within one or more systems described herein.

In this regard, FIG. 6 illustrates one example of a computer system 600 that can be employed to execute one or more embodiments of the present disclosure. Computer system 600 can be implemented on one or more general purpose networked computer systems, embedded computer systems, routers, switches, server devices, client devices, various intermediate devices/nodes or standalone computer systems. Additionally, computer system 600 can be implemented on various mobile clients such as, for example, a personal digital assistant (PDA), laptop computer, tablets, wearable compute device, pager, and the like, provided it includes sufficient processing capabilities.

Computer system 600 includes processing unit 602, system memory 604, and system bus 606 that couples various system components, including the system memory 604, to processing unit 602. Dual microprocessors and other multi-processor architectures also can be used as processing unit 602. System bus 606 may be any of several types of bus structure including a memory bus or memory controller, a peripheral bus, and a local bus using any of a variety of bus architectures. System memory 604 includes read only memory (ROM) 610 and random access memory (RAM) 612. A basic input/output system (BIOS) 614 can reside in ROM 610 containing the basic routines that help to transfer information among elements within computer system 600.

Computer system 600 can include a hard disk drive 616, magnetic disk drive 618, e.g., to read from or write to removable disk 620, and an optical disk drive 622, e.g., for reading CD-ROM disk 624 or to read from or write to other optical media. Hard disk drive 616, magnetic disk drive 618, and optical disk drive 622 are connected to system bus 606 by a hard disk drive interface 626, a magnetic disk drive interface 628, and an optical drive interface 630, respectively. The drives and associated computer-readable media provide nonvolatile storage of data, data structures, and computer-executable instructions for computer system 600. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 610, including operating system 632, one or more application programs 634, other program modules 636, and program data 638. In some examples, the application programs 634 can include the client computer executable instructions 206 or the controller computer executable instructions 406, and the program data 638 can include data captured by the one or more SRIP identity stations 102 and/or streamed between the SRIP identity station 102 and SRIP trusted agent station 104 via the one or more session control channels 110 and/or multimedia channels 112. The application programs 634 and program data 638 can include functions and methods programmed to prepare, initiate, engage, and/or manage one or more SRIP sessions, such as shown and described herein.

An applicant 103 may enter commands and information into computer system 600 through one or more input devices 640, such as a pointing device (e.g., a mouse, touch screen), keyboard, microphone, joystick, game pad, scanner, mobile phone, QR code, and the like. These and other input devices 640 are often connected to processing unit 602 through a corresponding port interface 642 that is coupled to the system bus, but may be connected by other interfaces, such as a parallel port, serial port, or universal serial bus (USB). One or more output devices 644 (e.g., display, a monitor, printer, projector, or other type of displaying device) is also connected to system bus 606 via interface 646, such as a video adapter.

Computer system 600 may operate in a networked environment using logical connections to one or more remote computers, such as remote computer 648. Remote computer 648 may be a workstation, computer system, router, peer device, or other common network node, and typically includes many or all the elements described relative to computer system 600. The logical connections, schematically indicated at 650, can include a local area network (LAN) and a wide area network (WAN). When used in a LAN networking environment, computer system 600 can be connected to the local network through a network interface or adapter 652. When used in a WAN networking environment, computer system 600 can include a modem, or can be connected to a communications server on the LAN. The modem, which may be internal or external, can be connected to system bus 606 via an appropriate port interface. In a networked environment, application programs 634 or program data 638 depicted relative to computer system 600, or portions thereof, may be stored in a remote memory storage device 654.

Although this disclosure includes a detailed description on a computing platform and/or computer, implementation of the teachings recited herein are not limited to only such computing platforms. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models (e.g., software as a service (SaaS, platform as a service (PaaS), and/or infrastructure as a service (IaaS)) and at least four deployment models (e.g., private cloud, community cloud, public cloud, and/or hybrid cloud). A cloud computing environment can be service oriented with a focus on statelessness, low coupling, modularity, and semantic interoperability.

Figure 7:
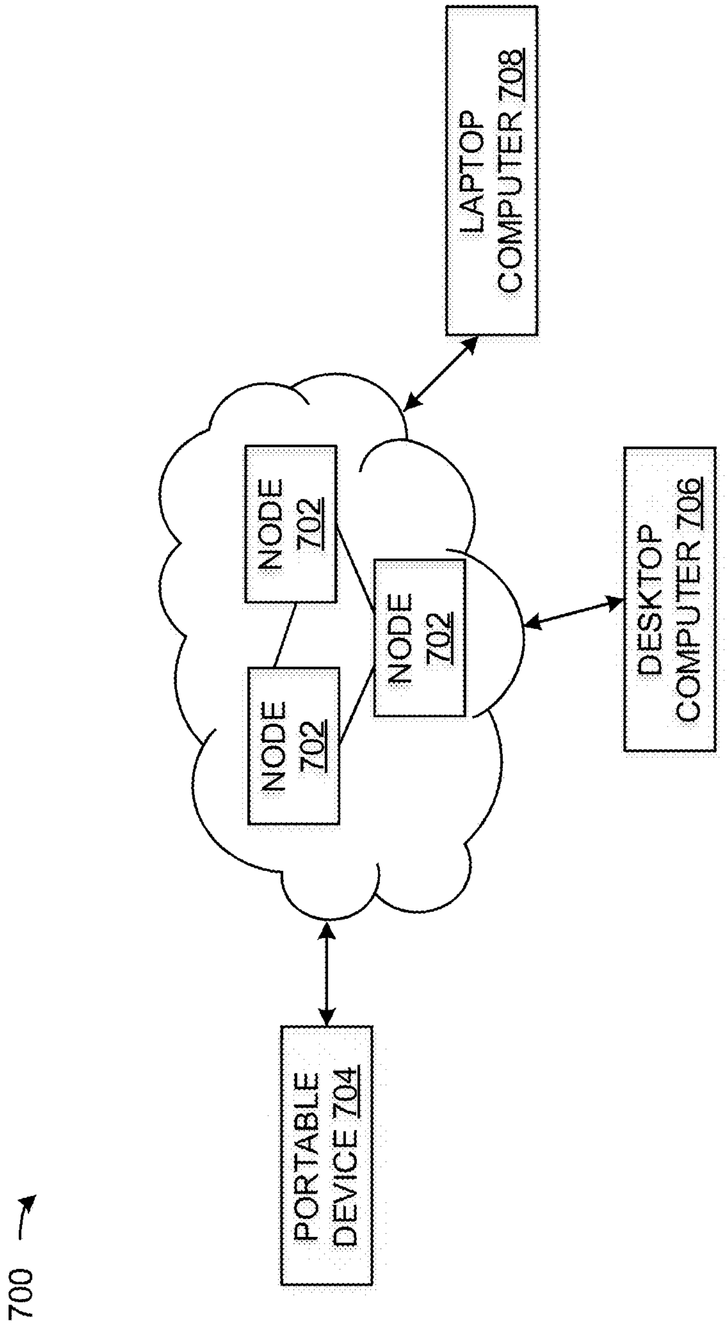
FIG. 7 illustrates a block diagram of a non-limiting example distributed computing architecture that can be implemented within one or more systems described herein.

FIG. 7 is an example of a cloud computing environment 700 that can be used for implementing one or more modules and/or systems in accordance with one or more examples, as disclosed herein. Thus, reference can be made to one or more examples of FIGS. 1-6 in the example of FIG. 7. As shown, cloud computing environment 700 can include one or more cloud computing nodes 702 (e.g., one or more multimedia processing modules 108) with which local computing devices used by cloud consumers (or users), such as, for example, personal digital assistant (PDA), cellular, or portable device 704, a desktop computer 706, and/or a laptop computer 708, may communicate. The computing nodes 702 can communicate with one another. In some examples, the computing nodes 702 can be grouped (not shown) physically or virtually, in one or more networks, such as Private, Community, Public, or Hybrid clouds, or a combination thereof. This allows the cloud computing environment 700 to offer infrastructure, platforms and/or software as services for which a cloud consumer does not need to maintain resources on a local computing device. The devices 704-708, as shown in FIG. 7, are intended to be illustrative and that computing nodes 702 and cloud computing environment 700 can communicate with any type of computerized device over any type of network and/or network addressable connection (e.g., using a web browser). In some examples, the one or more computing nodes 702 are used for implementing one or more examples disclosed herein relating to SRIP session establishment and/or management (e.g., orchestrating multiple SRIP sessions amongst a plurality of SRIP trusted agent stations 104 and/or processing multimedia streams between the SRIP identity station 102 and the SRIP trusted agent station 104). Thus, in some examples, the one or more computing nodes can be used to implement modules, platforms, and/or systems, as disclosed herein.

In some examples, the cloud computing environment 700 can provide one or more functional abstraction layers. It is be understood that the cloud computing environment 700 need not provide all of the one or more functional abstraction layers (and corresponding functions and/or components), as disclosed herein. For example, the cloud computing environment 700 can provide a hardware and software layer that can include hardware and software components. Examples of hardware components include: mainframes; RISC (Reduced Instruction Set Computer) architecture based servers; servers; blade servers; storage devices; and networks and networking components. In some embodiments, software components include network application server software and database software.

In some examples, the cloud computing environment 700 can provide a virtualization layer that provides an abstraction layer from which the following examples of virtual entities may be provided: virtual servers; virtual storage; virtual networks, including virtual private networks; virtual applications and operating systems; and virtual clients. In some examples, the cloud computing environment 700 can provide a management layer that can provide the functions described below. For example, the management layer can provide resource provisioning that can provide dynamic procurement of computing resources and other resources that are utilized to perform tasks within the cloud computing environment. The management layer can also provide metering and pricing to provide cost tracking as resources are utilized within the cloud computing environment 700, and billing or invoicing for consumption of these resources. In one example, these resources may include application software licenses. Security provides identity verification for cloud consumers and tasks, as well as protection for data and other resources. The management layer can also provide a user portal that provides access to the cloud computing environment 700 for consumers and system administrators. The management layer can also provide service level management, which can provide cloud computing resource allocation and management such that required service levels are met. Service Level Agreement (SLA) planning and fulfillment can also be provided to provide pre-arrangement for, and procurement of, cloud computing resources for which a future requirement is anticipated in accordance with an SLA.

In some examples, the cloud computing environment 700 can provide a workloads layer that provides examples of functionality for which the cloud computing environment 700 may be utilized. Examples of workloads and functions which may be provided from this layer include: mapping and navigation; software development and lifecycle management; data analytics processing; and transaction processing. Various embodiments of the present disclosure can utilize the cloud computing environment 700.

The present disclosure may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a quantum superposition state as qubits, a static random access memory (SRAM), a portable compact disc read-only memory (CD-ROM), a digital versatile disk (DVD), a memory stick, a floppy disk. a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process. such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, for example, the singular forms “a,” “an,” and “the” are intended to include the plural forms as well, unless the context clearly indicates otherwise. It will be further understood that the terms “contains”, “containing”, “includes”, “including,” “comprises”, and/or “comprising,” and variations thereof, when used in this specification, specify the presence of stated features, integers, steps, operations, elements, and/or components, but do not preclude the presence or addition of one or more other features, integers, steps, operations, elements, components, and/or groups thereof. In addition, the use of ordinal numbers (e.g., first, second, third, etc.) is for distinction and not counting. For example, the use of “third” does not imply there must be a corresponding “first” or “second.” Also, as used herein, the terms “coupled” or “coupled to” or “connected” or “connected to” or “attached” or “attached to” may indicate establishing either a direct or indirect connection, and is not limited to either unless expressly referenced as such. Furthermore, to the extent that the terms “includes,” “has,” “possesses,” and the like are used in the detailed description, claims, appendices and drawings such terms are intended to be inclusive in a manner similar to the term “comprising” as “comprising” is interpreted when employed as a transitional word in a claim. The term “based on” means “based at least in part on.” The terms “about” and “approximately” can be used to include any numerical value that can vary without changing the basic function of that value. When used with a range, “about” and “approximately” also disclose the range defined by the absolute values of the two endpoints, e.g. “about 2 to about 4” also discloses the range “from 2 to 4.” Generally, the terms “about” and “approximately” may refer to plus or minus 5-10% of the indicated number.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

ADDITIONAL EMBODIMENTS

The present disclosure is also directed to the following exemplary embodiments, which can be practiced in any combination thereof.

Embodiment 1: A system, comprising: memory to store computer executable instructions; and one or more processors, operatively coupled to the memory, that execute the computer executable instructions to implement: a supervised remote identity proofing (SRIP) manager configured to orchestrate SRIP session assignments amongst a plurality of SRIP trusted agent stations, and monitor connection integrity during an SRIP session between an SRIP trusted agent and an SRIP identity station, wherein the SRIP identity station is configured to capture multimedia data to facilitate an identity proofing operation, and wherein the SRIP trusted agent station is configured to receive the multimedia data to proctor the identity proofing operation; and a worker module configured to relay the multimedia data between the SRIP identity station and the SRIP trusted agent station via one or more multimedia communication channels. Embodiment 2: The system of embodiment 1, wherein the worker module is from a plurality of worker modules, and wherein the SRIP manager is further configured to allocate multimedia processing tasks associated with the SRIP session amongst the plurality of worker modules. Embodiment 3: The system of any of embodiments 1-2, wherein the plurality of worker modules are comprised within a distributed computing architecture. Embodiment 4: The system of any of embodiments 1-3, wherein the SRIP identity station comprises data collection equipment configured to capture the multimedia data, and wherein the SRIP trusted agent station is configured to control the data collection equipment remotely. Embodiment 5: The system of any of embodiments 1-4, wherein the SRIP manager is configured to assign a plurality of SRIP sessions to the SRIP trusted agent station, and wherein the SRIP trusted agent station is configured to proctor the plurality of SRIP sessions simultaneously. Embodiment 6: The system of any of embodiments 1-5, wherein the SRIP manager is configured to assign the SRIP session to the SRIP trusted agent station from the plurality of SRIP trusted agent stations based on a trait associated with the SRIP trusted agent station and delineated in a session request generated by the SRIP identity station. Embodiment 7: The system of any of embodiments 1-6, wherein the SRIP manager is configured to monitor the integrity of the connection between the SRIP manager and the SRIP trusted agent station and between the SRIP manager and the SRIP identity station during the SRIP session using a heartbeat exchange. Embodiment 8: The system of any of embodiments 1-7: wherein the SRIP manager is configured to manage the SRIP session via one or more session control communication channels that are separate from the one or more multimedia communication channels. Embodiment 9: The system of any of embodiments 1-8, wherein the one or more multimedia communication channels are established between the worker module, the SRIP identity station, and the SRIP trusted agent station; and wherein the one or more session control communication channels are established between the SRIP manager, the SRIP identity station, and the SRIP trusted agent station.

Embodiment 10: A computer-implemented method, comprising: assigning, by one or more first processors, supervised remote identity proofing (SRIP) sessions amongst a plurality of SRIP trusted agent stations; monitoring, by the one or more first processors, connection integrity during an SRIP session between an SRIP trusted agent station and an SRIP identity station, wherein the SRIP identity station is configured to capture multimedia data to facilitate an identity proofing operation, and wherein the SRIP trusted agent station is configured to receive the multimedia data to proctor the identity proofing operation; and relaying, by one or more second processors, the multimedia data between the SRIP identity station and the SRIP trusted agent station via one or more multimedia communication channels. Embodiment 11: The computer-implemented method of embodiment 10, further comprising: allocating, by the one or more first processors, multimedia processing tasks amongst a plurality of computer modules hosted in a distributed computing architecture. Embodiment 12: The computer-implemented method of any of embodiments 10-11. further comprising: capturing, via the SRIP identity station, the multimedia data via an operation of data collection equipment that is controlled by the SRIP trusted agent station. Embodiment 13: The computer-implemented method of any of embodiments 11-12, wherein the assigning the SRIP sessions includes assigning a plurality of SRIP sessions to the SRIP trusted agent station, and wherein the SRIP trusted agent station is configured to proctor the plurality of SRIP sessions simultaneously. Embodiment 14: The computer-implemented method of any of embodiments 11-13, wherein the assigning the SRIP sessions is based on a trait associated with the SRIP trusted agent station and delineated in a session request generated by the SRIP identity station.

Embodiment 15: The computer-implemented method of any of embodiments 11-14, further comprising: managing, by the one or more first processors, the SRIP session via one or more session control communication channels that are separate from the one or more multimedia communication channels. Embodiment 16: A computer program product for establishing a supervised remote identity proofing (SRIP) session, the computer program product comprising a computer readable storage medium having computer executable instructions embodied therewith, the computer executable instructions executable by one or more processors to cause the one or more processors to: assign SRIP sessions amongst a plurality of SRIP trusted agent stations; monitor connection integrity during the SRIP session between an SRIP trusted agent station and an SRIP identity station, wherein the SRIP identity station is configured to capture multimedia data to facilitate an identity proofing operation, and wherein the SRIP trusted agent station is configured to receive the multimedia data to proctor the identity proofing operation; and relay the multimedia data between the SRIP identity station and the SRIP trusted agent station via one or more multimedia communication channels. Embodiment 17: The computer program product of embodiment 16, wherein the computer executable instructions further cause the one or more processors to: allocate multimedia processing tasks amongst a plurality of computer modules hosted in a distributed computing architecture. Embodiment 18: The computer program product of any of embodiments 16-17, wherein the computer executable instructions further cause the one or more processors to: capture, via the SRIP identity station, the multimedia data via an operation of data collection equipment that is controlled by the SRIP trusted agent station. Embodiment 19: The computer program product of any of embodiments 16-18, wherein the computer executable instructions further cause the one or more processors to: assign a plurality of SRIP sessions to the SRIP trusted agent station based on a trait associated with the SRIP trusted agent station and delineated in a session request generated by the SRIP identity station, and wherein the SRIP trusted agent station is configured to proctor the plurality of SRIP sessions simultaneously. Embodiment 20: The computer program product of any of embodiments 16-19, wherein the computer executable instructions further cause the one or more processors to: manage the SRIP session via one or more session control communication channels that are separate from the one or more multimedia communication channels.

The invention claimed is:

1. A system, comprising:

memory to store computer executable instructions; and one or more processors, operatively coupled to the memory, that execute the computer executable instructions to implement:

a supervised remote identity proofing (SRIP) manager configured to orchestrate SRIP session assignments amongst a plurality of SRIP trusted agent stations by matching SRIP session requests with available SRIP trusted agent stations from the plurality of SRIP trusted agent stations, and monitor connection integrity during an SRIP session between an SRIP trusted agent station and an SRIP identity station, wherein the SRIP identity station is configured to capture multimedia data to facilitate at least one of an identity proofing operation, an identity verification operation, and an identity validation operation, and wherein the SRIP trusted agent station is configured to receive the multimedia data to proctor the at least one of the identity proofing operation, the identity verification operation, and the identity validation operation, wherein the SRIP manager is configured to assign a plurality of SRIP sessions to the SRIP trusted agent station based on one or more traits associated with the SRIP trusted agent and delineated in a session request generated by the SRIP identity station; and a worker module configured to relay the multimedia data between the SRIP identity station and the SRIP trusted agent station via one or more multimedia communication channels.

2. The system of claim 1, wherein the worker module is from a plurality of worker modules, and wherein the SRIP manager is further configured to allocate multimedia processing tasks associated with the SRIP session amongst the plurality of worker modules.

3. The system of claim 2, wherein the plurality of worker modules are comprised within a distributed computing architecture.

4. The system of claim 1, wherein the SRIP identity station comprises data collection equipment configured to capture the multimedia data, and wherein the SRIP trusted agent station is configured to control the data collection equipment remotely.

5. The system of claim 1, wherein the SRIP manager is configured to assign a plurality of SRIP sessions to the SRIP trusted agent station, and wherein the SRIP trusted agent station is configured to proctor the plurality of SRIP sessions simultaneously.

6. The system of claim 1, wherein the SRIP manager is configured to monitor the integrity of the connection between the SRIP manager and the SRIP trusted agent station and between the SRIP manager and the SRIP identity station during the SRIP session using a heartbeat and a quality of service exchange.

7. The system of claim 1, wherein the SRIP manager is configured to manage the SRIP session via one or more session control communication channels that are separate from the one or more multimedia communication channels.

8. The system of claim 1, wherein the one or more multimedia communication channels are established between the worker module, the SRIP identity station, and the SRIP trusted agent station; and wherein the one or more session control communication channels are established between the SRIP manager, the SRIP identity station, and the SRIP trusted agent station.

9. A computer-implemented method, comprising:

assigning, by one or more first processors, supervised remote identity proofing (SRIP) sessions amongst a plurality of SRIP trusted agent stations by matching SRIP session requests with available SRIP trusted agent stations from the plurality of SRIP trusted agent stations, wherein the assigning the SRIP sessions includes assigning a plurality of SRIP sessions to the SRIP trusted agent station based on one or more traits associated with the SRIP trusted agent station and delineated in a session request generated by the SRIP identity station;

monitoring, by the one or more first processors, connection integrity during an SRIP session between an SRIP trusted agent station and an SRIP identity station, wherein the SRIP identity station is configured to capture multimedia data to facilitate an identity proofing operation, and wherein the SRIP trusted agent station is configured to receive the multimedia data to proctor the identity proofing operation; and relaying, by one or more second processors, the multimedia data between the SRIP identity station and the SRIP trusted agent station via one or more multimedia communication channels.

10. The computer-implemented method of claim 9, further comprising:

allocating, by the one or more first processors, multimedia processing tasks amongst a plurality of computer modules hosted in a distributed computing architecture.

11. The computer-implemented method of claim 9, further comprising:

capturing, via the SRIP identity station, the multimedia data via an operation of data collection equipment that is controlled by the SRIP trusted agent station.

12. The computer-implemented method of claim 9, wherein the assigning the SRIP sessions includes assigning a plurality of SRIP sessions to the SRIP trusted agent station, and wherein the SRIP trusted agent station is configured to proctor the plurality of SRIP sessions simultaneously.

13. The computer-implemented method of claim 9, further comprising:

managing, by the one or more first processors, the SRIP session via one or more session control communication channels that are separate from the one or more multimedia communication channels.

14. A computer program product for establishing a supervised remote identity proofing (SRIP) session, the computer program product comprising a computer readable storage medium having computer executable instructions embodied therewith, the computer executable instructions executable by one or more processors to cause the one or more processors to:

assign SRIP sessions amongst a plurality of SRIP trusted agent stations by matching SRIP session requests with available SRIP trusted agent stations from the plurality of SRIP trusted agent stations, wherein the computer executable instructions further cause the one or more processor to:

assign a plurality of SRIP sessions to the SRIP trusted agent station based on one or more traits associated with the SRIP trusted agent station and delineated in a session request generated by the SRIP identity station;

monitor connection integrity during the SRIP session between an SRIP trusted agent and an SRIP identity station, wherein the SRIP identity station is configured to capture multimedia data to facilitate an identity proofing operation, and wherein the SRIP trusted agent station is configured to receive the multimedia data to proctor the identity proofing operation; and relay the multimedia data between the SRIP identity station and the SRIP trusted agent station via one or more multimedia communication channels.

15. The computer program product of claim 14, wherein the computer executable instructions further cause the one or more processors to:

allocate multimedia processing tasks amongst a plurality of computer modules hosted in a distributed computing architecture.

16. The computer program product of claim 14, wherein the computer executable instructions further cause the one or more processors to:

capture, via the SRIP identity station, the multimedia data via an operation of data collection equipment that is controlled by the SRIP trusted agent station.

17. The computer program product of claim 14, wherein the computer executable instructions further cause the one or more processors to:

assign a plurality of SRIP sessions to the SRIP trusted agent station based on one or more traits associated with the SRIP trusted agent station and delineated in a session request generated by the SRIP identity station, and wherein the SRIP trusted agent station is configured to proctor the plurality of SRIP sessions simultaneously.

18. The computer program product of claim 14, wherein the computer executable instructions further cause the one or more processors to:

manage the SRIP session via one or more session control communication channels that are separate from the one or more multimedia communication channels.

* * * * *